US012742406B2

(12) United States Patent
Alano et al.

(10) Patent No.: US 12,742,406 B2
(45) Date of Patent: Sep. 22, 2026

(54) DECOMPOSITION CHAMBER FOR AFTERTREATMENT SYSTEM

(71) Applicant: Cummins Emission Solutions Inc., Columbus, IN (US)

(72) Inventors: Eduardo Alano, Columbus, IN (US); Carlos Wesley Gomes de Souza, Columbus, IN (US); James Andrew Cherry, Madison, WI (US); Robert Boyd, Stoughton, WI (US); James Lloyd Rece, Stoughton, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 19/047,946

(22) Filed: Feb. 7, 2025

(65) Prior Publication Data

US 2026/0235063 A1 Aug. 13, 2026

(51) Int. Cl.

*F01N 3/28* (2006.01)
*B01F 25/40* (2022.01)
(Continued)

(52) U.S. Cl.

CPC ........... *F01N 3/2882* (2013.01); *F01N 3/208* (2013.01); *B01F 25/40* (2022.01); *B01F 27/112* (2022.01);
(Continued)

(58) Field of Classification Search

CPC .......... F01N 1/086; F01N 1/088; F01N 3/206; F01N 3/2066; F01N 3/208; F01N 3/2882;
(Continued)

(56) References Cited

U.S. PATENT DOCUMENTS

| | | |
|---|---|---|
| 3,317,001 A | 5/1967 | Powers et al. |
| 3,348,629 A | 10/1967 | Cassel |

(Continued)

FOREIGN PATENT DOCUMENTS

| | | |
|---|---|---|
| CN | 301522079 S | 4/2011 |
| CN | 308758674 S | 5/2024 |

(Continued)

OTHER PUBLICATIONS 2013-2018 Ram 6.7 Cummins Exhaust System, posted Mar. 28, 2019 [online], [retrieved Jul. 21, 2025]. Retrieved from internet, https:// www.youtube.com/watch?v= EPxW5ebtybc (Year: 2019).

(Continued)

*Primary Examiner* — Binh Q Tran
(74) *Attorney, Agent, or Firm* — Foley & Lardner LLP

(57) ABSTRACT

A decomposition chamber for an aftertreatment system includes a conduit centered on a conduit axis extending from an inlet to an outlet. The decomposition chamber includes a first mixing plate disposed in the conduit and having a plurality of first vertical crossmember, a plurality of first transverse crossmembers, and a plurality of first deflectors The decomposition chamber includes a second mixing plate disposed in the conduit downstream of the first mixing plate, the second mixing plate having a plurality of second vertical crossmembers, a plurality of second transverse crossmembers, and a plurality of second deflectors. The decomposition chamber includes a vane mixer disposed in the conduit downstream of the first mixing plate and the second mixing plate and a baffle.

22 Claims, 14 Drawing Sheets

(51) Int. Cl.
*B01F 27/112* (2022.01)
*B01F 27/1125* (2022.01)
*F01N 1/08* (2006.01)
*F01N 3/20* (2006.01)

(52) U.S. Cl.
CPC ......... *B01F 27/11251* (2022.01); *F01N 1/088* (2013.01); *F01N 3/206* (2013.01); *F01N 2240/20* (2013.01); *F01N 2610/1453* (2013.01)

(58) Field of Classification Search
CPC ............... F01N 3/2892; F01N 2240/20; F01N 2330/08; F01N 2610/01; F01N 2610/14; F01N 2610/1453; F01N 2900/04; F01N 2900/1411; B01F 25/40; B01F 25/4233; B01F 27/111; B01F 27/112; B01F 27/1125; B01F 27/11251; B01F 27/1152
See application file for complete search history.

(56) References Cited

U.S. PATENT DOCUMENTS

| | | | | |
|---|---|---|---|---|
| 3,500,954 | A | 3/1970 | Willette | |
| 5,325,665 | A | 7/1994 | Kiso et al. | |
| 5,524,739 | A | 6/1996 | Baier et al. | |
| 5,605,399 | A | 2/1997 | King | |
| 5,726,397 | A | 3/1998 | Mukai et al. | |
| 6,182,445 | B1 | 2/2001 | Yamazaki et al. | |
| D444,751 | S | 7/2001 | Park | |
| 7,814,745 | B2 | 10/2010 | Levin et al. | |
| D645,882 | S | 9/2011 | Duffek et al. | |
| D702,736 | S | 4/2014 | Tomioka et al. | |
| 9,341,097 | B2 | 5/2016 | Bays et al. | |
| 9,718,037 | B2 | 8/2017 | Harmon et al. | |
| D809,577 | S | 2/2018 | Mcdonald et al. | |
| 9,909,421 | B2 | 3/2018 | Staskowiak et al. | |
| 10,012,125 | B2 | 7/2018 | Yi et al. | |
| D855,090 | S | 7/2019 | Mcdonald et al. | |
| 10,450,921 | B2 | 10/2019 | Osada et al. | |
| 10,844,764 | B2 | 11/2020 | Brandl et al. | |
| 11,136,910 | B2 | 10/2021 | Liu et al. | |
| 2006/0150614 | A1 * | 7/2006 | Cummings | F01N 3/0892 60/275 |
| 2006/0283181 | A1 * | 12/2006 | Crawley | F01N 3/035 60/303 |
| 2010/0107614 | A1 | 5/2010 | Levin et al. | |
| 2011/0005208 | A1 | 1/2011 | Hamill | |
| 2011/0094206 | A1 | 4/2011 | Liu et al. | |
| 2012/0204541 | A1 | 8/2012 | Li et al. | |
| 2013/0104531 | A1 | 5/2013 | Cho et al. | |
| 2013/0170973 | A1 * | 7/2013 | Staskowiak | F01D 5/00 415/208.1 |
| 2014/0033686 | A1 * | 2/2014 | Fischer | F01N 13/1816 60/286 |
| 2014/0260202 | A1 | 9/2014 | Bays et al. | |
| 2015/0218996 | A1 | 8/2015 | Brandl et al. | |
| 2016/0175784 | A1 * | 6/2016 | Harmon | B01F 23/2132 366/167.1 |
| 2016/0312679 | A1 | 10/2016 | Schellin et al. | |
| 2017/0314444 | A1 * | 11/2017 | Yi | B01F 25/3131 |
| 2017/0342886 | A1 | 11/2017 | Gavin et al. | |
| 2017/0361287 | A1 | 12/2017 | Kim et al. | |
| 2019/0120110 | A1 | 4/2019 | Osada et al. | |
| 2019/0203626 | A1 * | 7/2019 | Abhyankar | F01N 3/2892 |
| 2022/0298949 | A1 * | 9/2022 | Chiruta | B01F 25/432 |
| 2024/0360779 | A1 | 10/2024 | Riddle, II et al. | |

FOREIGN PATENT DOCUMENTS

| | | | |
|---|---|---|---|
| CN | 308618250 | S | 7/2024 |
| CN | 309135625 | S | 2/2025 |
| GB | 2 595 019 | A | 11/2021 |
| KR | 300505022 | S | 9/2008 |
| KR | 301004836 | S | 5/2019 |
| RU | 00117480 | S | 11/2019 |
| WO | WO-2020/250015 | A1 | 12/2020 |

OTHER PUBLICATIONS

Diesel Aftertreatment Tech tip, posted Sep. 30, 2020 [online], [retrieved Jul. 21, 2025]. Retrieved from internet, https:// www.youtube.com/watch?v=bfl5Xw1 mxBQ (Year: 2020).

Diesel Exhaust Systems, posted Feb. 2008 [online], [retrieved Jul. 21, 2025]. Retrieved from internet, https://dieselnet.com/tech/ diesel_exh_sys.php (Year: 2008).

Restriction Requirement in Design U.S. Appl. No. 29/935,369 issued Jul. 23, 2025.

Torchtree 53425 Catalytic Converter For Ranger 2001 2002 2003 2.3L 2.5L 3L 4L, posted Aug. 16, 2023 [online], [retrieved Jul. 21, 2025]. Retrieved from internet, https://www.amazon.com/T orchtree-53425-Catalytic-Converter-2001-2003/dp/BOC FWKPZ?F /ref (Year: 2023).

Non-Final Office Action in U.S. Appl. No. 18/543,149 issued Jan. 14, 2025.

Office Action in U.S. Appl. No. 19/081,694 issued Feb. 18, 2026.

* cited by examiner

DECOMPOSITION CHAMBER FOR AFTERTREATMENT SYSTEM

TECHNICAL FIELD

The present application relates generally to decomposition chambers for an aftertreatment system of an internal combustion engine.

BACKGROUND

For internal combustion engines, such as diesel engines, nitrogen oxide ($NO_x$) compounds may be emitted in exhaust. It is desirable to reduce $NO_x$ emissions to comply with environmental regulations, for example. To reduce $NO_x$ emissions, a reductant may be dosed into the exhaust by a dosing system and within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

SUMMARY

A component of the aftertreatment system may facilitate a chemical reaction between the exhaust and the reductant by causing mixing of the exhaust and reductant. However, depending on its configuration, the component can cause decreases in performance and/or efficiency of an internal combustion engine associated with the aftertreatment system. For example, the component may cause an increase in back pressure on the internal combustion engine, which can cause decreased efficiency of the internal combustion engine.

Certain embodiments of the present invention may address these issues.

In one embodiment, a decomposition chamber for an aftertreatment system comprises a conduit having an inlet and an outlet, the conduit extends along a conduit axis from the inlet to the outlet. The decomposition chamber includes a first mixing plate disposed in the conduit. The first mixing plate includes a plurality of first vertical crossmembers, a plurality of first transverse crossmembers, and a plurality of first deflectors. Each of the first transverse crossmembers are coupled to at least one of the first vertical crossmembers. Each of the first deflectors are coupled to one of the first vertical crossmembers or one of the first transverse crossmembers. The decomposition chamber includes a second mixing plate disposed in the conduit downstream of the first mixing plate. The second mixing plate includes a plurality of second vertical crossmembers, a plurality of second transverse crossmembers, and a plurality of second deflectors. Each of the second transverse crossmembers are coupled to at least one of the second vertical crossmembers. Each of the second deflectors are coupled to one of the second vertical crossmembers or one of the second transverse crossmembers. The decomposition chamber includes a vane mixer disposed in the conduit downstream of the first mixing plate and the second mixing plate. The vane mixer includes a plurality of vanes. The vanes define a plurality of vane apertures therebetween. The decomposition chamber includes a baffle coupled to the conduit wall and comprising a portion having a partial annular shape.

In one embodiment, which is combinable with any of the above-described embodiments, the decomposition chamber comprises a doser mount coupled to the conduit. The doser mount comprises an injection opening centered on an injection axis. In a cross-sectional view along the conduit axis of the conduit, the injection axis of the doser mount is oriented at an injection angle between 105 degrees and 165 degrees, inclusive, relative to the conduit axis.

In one embodiment, which is combinable with any of the above-described embodiments, a reference plane extends along the conduit axis of the conduit, an orientation of a first plate plane in which the plurality of first vertical crossmembers extend is at a first plate angle between 30 degrees and 90 degrees clockwise, inclusive, relative to the conduit axis.

In one embodiment, which is combinable with any of the above-described embodiments, a reference plane extends along the conduit axis of the conduit, an orientation of a second plate plane in which the plurality of second vertical crossmembers extend is at a second plate angle between 30 degrees and 90 degrees clockwise, inclusive, relative to the conduit axis.

In one embodiment, which is combinable with any of the above-described embodiments, the doser mount includes a connection port defining an injection opening, an upstream wall extending from the connection port toward the inlet of the conduit, and a downstream wall extending from the connection port toward the outlet of the conduit. In a reference plane, which extends along the conduit axis of the conduit, the upstream wall is oriented at a first mount angle between 0 degrees and 5 degrees, inclusive, relative to the conduit axis and the downstream wall is oriented at a second mount angle between 135 degrees and 175 degrees, inclusive, relative to the conduit axis.

In one embodiment, which is combinable with any of the above-described embodiments, the vane mixer is disposed a first distance from the first mixing plate along the conduit axis and the baffle is disposed a second distance from the vane mixer along the conduit axis, the second distance is greater than the first distance.

In one embodiment, which is combinable with any of the above-described embodiments, the first mixing plate includes a first upstream edge. A first portion of the first upstream edge is positioned at a first location along the conduit axis and opposite the doser mount, and a second portion of the first upstream edge is positioned at a second location along the conduit axis adjacent and downstream of the doser mount. The second mixing plate includes a second upstream edge. A first portion of the second upstream edge is positioned at a third location along the conduit axis and opposite the doser mount and a second portion of the second upstream edge is positioned at a fourth location along the conduit axis adjacent and downstream of the doser mount.

In one embodiment, which is combinable with any of the above-described embodiments, in a reference plane that extends along the conduit axis of the conduit, the injection axis is at a deflection angle between 10 degrees and 120 degrees, inclusive, relative to a mixer plane in which the plurality of first vertical crossmembers and the plurality of second vertical crossmembers extend.

In one embodiment, which is combinable with any of the above-described embodiments, the baffle includes a baffle wall coupled to the conduit and a baffle flange projecting radially inward from the baffle wall.

In one embodiment, which is combinable with any of the above-described embodiments, the baffle flange is disposed along a baffle plane, the baffle plane is perpendicular to the reference plane, which extends along the conduit axis of the conduit. In the reference plane, a mixer plane, in which the plurality of first vertical crossmembers and second vertical crossmembers extend is at a mixer plane angle between 0 degrees and 80 degrees, inclusive relative to the baffle plane.

In one embodiment, which is combinable with any of the above-described embodiments, the baffle extends along a portion of the inner surface of the conduit and a reference plane which extends along the conduit axis of the conduit bisects the doser mount and extends through a portion of the baffle.

In one embodiment, which is combinable with any of the above-described embodiments, an upstream portion of the plurality of first defectors and an upstream portion of the plurality of second deflectors defines a deflector plane, wherein, in a reference plane, which extends along the conduit axis of the conduit the deflector plane is parallel to the conduit axis.

In one embodiment, which is combinable with any of the above-described embodiments, the first mixing plate is parallel to the second mixing plate.

In one embodiment, which is combinable with any of the above-described embodiments, the first mixing plate comprises a first downstream edge, the first downstream edge is separated from the second upstream edge by a distance that is less than 100 millimeters.

In another embodiment, a decomposition chamber for an aftertreatment system comprises a conduit having an inlet and an outlet and extending along a conduit axis from the inlet to the outlet. The decomposition chamber includes a first mixing plate disposed in the conduit. The first mixing plate includes a downstream edge, a plurality of first vertical crossmembers, a plurality of first transverse crossmembers, and a plurality of first deflectors. Each of the first transverse crossmembers are coupled to at least one of the first vertical crossmembers. Each of the first deflectors are coupled to one of the first vertical crossmembers or one of the first transverse crossmembers. The decomposition chamber includes a second mixing plate disposed in the conduit downstream of the first mixing plate. The second mixing plate includes an upstream edge, a plurality of second vertical crossmembers, a plurality of second transverse crossmembers, and a plurality of second deflectors. Each of the second transverse crossmembers are coupled to at least one of the second vertical crossmembers. Each of the second deflectors are coupled to one of the second vertical crossmembers or one of the second transverse crossmembers. The downstream edge is separated from the upstream edge by a distance that is less than 100 millimeters. In a reference plane, that extends along the conduit axis of the conduit, an orientation of a first plate plane in which the plurality of first vertical crossmembers extend is parallel to an orientation of a second plate plane in which the plurality of second vertical crossmembers extend.

In one embodiment, which is combinable with any of the above-described embodiments, the decomposition chamber comprises a doser mount coupled to the conduit. The doser mount comprises an injection opening centered on an injection axis. In a cross-sectional view along the conduit axis of the conduit, the injection axis of the doser mount is oriented at an injection angle between 105 degrees and 165 degrees, inclusive, relative to the conduit axis.

In one embodiment, which is combinable with any of the above-described embodiments, a reference plane extends along the conduit axis of the conduit, an orientation of a first plate plane in which the plurality of first vertical crossmembers extend is at a first plate angle between 30 degrees and 90 degrees clockwise, inclusive, relative to the conduit axis.

In one embodiment, which is combinable with any of the above-described embodiments, a reference plane extends along the conduit axis of the conduit, an orientation of a second plate plane in which the plurality of second vertical crossmembers extend is at a second plate angle between 30 degrees and 90 degrees clockwise, inclusive, relative to the conduit axis.

In another embodiment, a decomposition chamber for an aftertreatment system comprises a conduit having an inlet and an outlet and extending along a conduit axis from the inlet to the outlet. The decomposition chamber includes a first mixing plate disposed in the conduit. The first mixing plate includes a downstream edge, a plurality of first vertical crossmembers, a plurality of first transverse crossmembers, and a plurality of first deflectors. Each of the first transverse crossmembers are coupled to at least one of the first vertical crossmembers. Each of the first deflectors are coupled to one of the first vertical crossmembers or one of the first transverse crossmembers. In a reference plane, which extends along the conduit axis of the conduit, an orientation of a first plate plane in which the plurality of first vertical crossmembers extend is oblique to the conduit axis. The decomposition chamber includes a second mixing plate disposed in the conduit downstream of the first mixing plate. The second mixing plate includes an upstream edge, a plurality of second vertical crossmembers, a plurality of second transverse crossmembers, and a plurality of second deflectors. Each of the second transverse crossmembers are coupled to at least one of the second vertical crossmembers. Each of the second deflectors are coupled to one of the second vertical crossmembers or one of the second transverse crossmembers. In the reference plane, which extends along the conduit axis of the conduit, an orientation of a second plate plane in which the plurality of second vertical crossmembers extend is oblique to the conduit axis. The downstream edge is separated from the upstream edge by a distance that is less than 100 millimeters. In a reference plane, that extends along the conduit axis of the conduit, an orientation of a first plate plane in which the plurality of first vertical crossmembers extend is parallel to an orientation of a second plate plane in which the plurality of second vertical crossmembers extend.

In one embodiment, which is combinable with any of the above-described embodiments, the decomposition chamber comprises a doser mount coupled to the conduit. The doser mount comprises an injection opening centered on an injection axis. In a cross-sectional view along the conduit axis of the conduit, the injection axis of the doser mount is oriented at an injection angle between 105 degrees and 165 degrees, inclusive, relative to the conduit axis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

Figure 1:
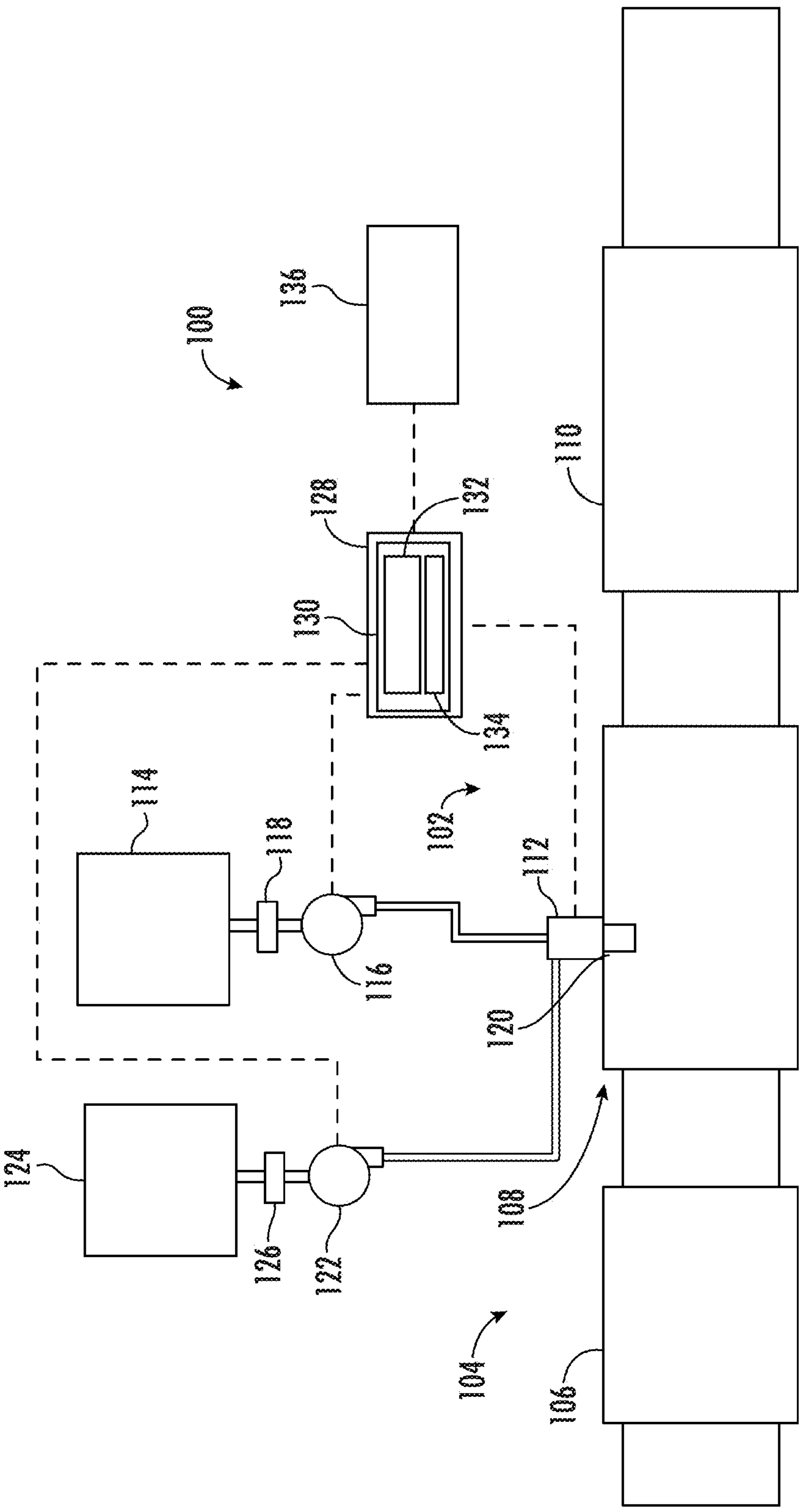
FIG. 1 is a block diagram of an example aftertreatment system.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing decomposing chambers in an aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that contains constituents, such as $NO_x$, $N_2$, $CO_2$, and/or $H_2O$. In some applications, an aftertreatment system is utilized to dose the exhaust with a reductant so as to reduce $NO_x$ emissions in the exhaust. These aftertreatment systems may include a decomposition chamber within which the reductant is provided and mixed with the exhaust.

Enhancing mixing of the reductant and exhaust can increase reduction of the $NO_x$ emissions and therefore increase desirability of an aftertreatment system. However, enhancing mixing of the reductant and exhaust can cause increased backpressure on an internal combustion engine having the aftertreatment system, thereby decreasing desirability of the aftertreatment system (e.g., because performance of the internal combustion engine is negatively impacted by the increased backpressure, etc.). Additionally, the reductant may form deposits within the aftertreatment system, such as on internal surfaces of the decomposition chamber, which increase the backpressure on the internal combustion engine and/or inhibit the ability to reduce $NO_x$ emissions.

Some systems may include a decomposition chamber that is centered on an axis that is offset from an axis from which an inlet conduit is centered and offset from an axis on which an outlet conduit is centered. However, such a configuration can make it difficult to uniformly distribute reductant within the exhaust gas without increasing the backpressure within the system.

It is thus desirable to provide a decomposition chamber with various components configured to more uniformly distribute the reductant within the exhaust. A decomposition chamber is provided with a conduit having an inlet, an outlet, and a conduit extending between the inlet and the outlet. The conduit is centered on a conduit axis. A doser mount is coupled to the conduit to facilitate injection of a reductant into the exhaust flowing through the decomposition chamber. A combination of a first mixing plate, a second mixing plate, a vane mixer, and a baffle are disposed in the conduit to improve distribution of the reductant within the exhaust. In a side cross-sectional view of the decomposition chamber, the vane mixer and the baffle are oriented perpendicular to the conduit axis, and the first mixing plate and the second mixing plate are oriented at a different angle from the conduit axis. For example, in the side cross-sectional view, an upper portion of the first mixing plate is disposed downstream of a lower portion of the first mixing plate such that the lower portion is disposed below the doser mount and the upper portion is disposed adjacent to and downstream of the doser mount. For example, in the cross-sectional view, an upper portion of the second mixing plate is disposed downstream of a lower portion of the second mixing plate such that the lower portion is disposed below the doser mount and the upper portion is disposed adjacent to and downstream of the doser mount. The combination of the first mixing plate and the second mixing plate is configured to improve decomposition rate. The angle of the first mixing plate and the second mixing plate relative to the conduit axis and relative to an injection axis of the doser mount is configured to improve distribution of the reductant within the exhaust.

II. Example Aftertreatment System

FIG. 1 depicts an aftertreatment system 100 having an example reductant delivery system 102 for an exhaust conduit system 104 (e.g., pipe system, tube system, etc.). The aftertreatment system 100 includes the reductant delivery system 102, a particulate filter 106 (e.g., a diesel particulate filter (DPF), etc.), a decomposition chamber 108 (e.g., decomposition reactor, reactor pipe, decomposition tube, reactor tube, etc.), and a selective catalytic reduction (SCR) catalyst member 110.

The particulate filter 106 is configured to remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The decomposition chamber 108 is configured to convert a reductant into ammonia. The reductant may be, for example, urea, diesel exhaust fluid (DEF), Adblue©, a urea water solution (UWS), an aqueous urea solution (e.g., AUS32, etc.), and other similar fluids. The decomposition chamber 108 includes an inlet fluidly coupled to (e.g., fluidly configured to communicate with, etc.) the particulate filter 106 to receive the exhaust containing $NO_x$ emissions and an outlet for the exhaust, $NO_x$ emissions, ammonia, and/or reductant to flow to the SCR catalyst member 110.

The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate (e.g., allow, permit, etc.) prolonged desirable operation of the reductant pump 116. In some embodiments, the reductant pump 116 is coupled to (e.g., attached to, fixed to, welded to, integrated with, etc.) a chassis of a vehicle associated with the aftertreatment system 100.

The dosing module 112 includes at least one injector 120. Each injector 120 is configured to dose the reductant into the exhaust (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst member 110. As a result, the reductant is injected by the injector 120 upstream of the SCR catalyst member 110 such that the SCR catalyst member 110 receives a mixture of the reductant and exhaust. The reductant droplets undergo the processes of evaporation, thermolysis, and hydrolysis to form non-$NO_x$ emissions (e.g., gaseous ammonia, etc.) within the decomposition chamber 108 and/or the exhaust conduit system 104.

The SCR catalyst member 110 is configured to assist in the reduction of $NO_x$ emissions by accelerating a $NO_x$ reduction process between the reductant and the $NO_x$ of the exhaust into diatomic nitrogen, water, and/or carbon dioxide. The SCR catalyst member 110 includes an inlet fluidly coupled to the decomposition chamber 108 from which exhaust and reductant are received and an outlet fluidly coupled to an end of the exhaust conduit system 104.

The aftertreatment system 100 may further include an oxidation catalyst (e.g., a diesel oxidation catalyst (DOC)) fluidly coupled to the exhaust conduit system 104 (e.g., downstream of the SCR catalyst member 110 or upstream of the particulate filter 106) to oxidize hydrocarbons and carbon monoxide in the exhaust.

In some implementations, the particulate filter 106 may be positioned downstream of the decomposition chamber 108. For instance, the particulate filter 106 and the SCR catalyst member 110 may be combined into a single unit. In some implementations, the dosing module 112 may instead be positioned downstream of a turbocharger or upstream of a turbocharger.

While the aftertreatment system 100 has been shown and described in the context of use with a diesel internal combustion engine, it is understood that the aftertreatment system 100 may be used with other internal combustion engines, such as gasoline internal combustion engines, hybrid internal combustion engines, propane internal combustion engines, and other similar internal combustion engines.

III. Example Decomposition Chamber

Figure 2:
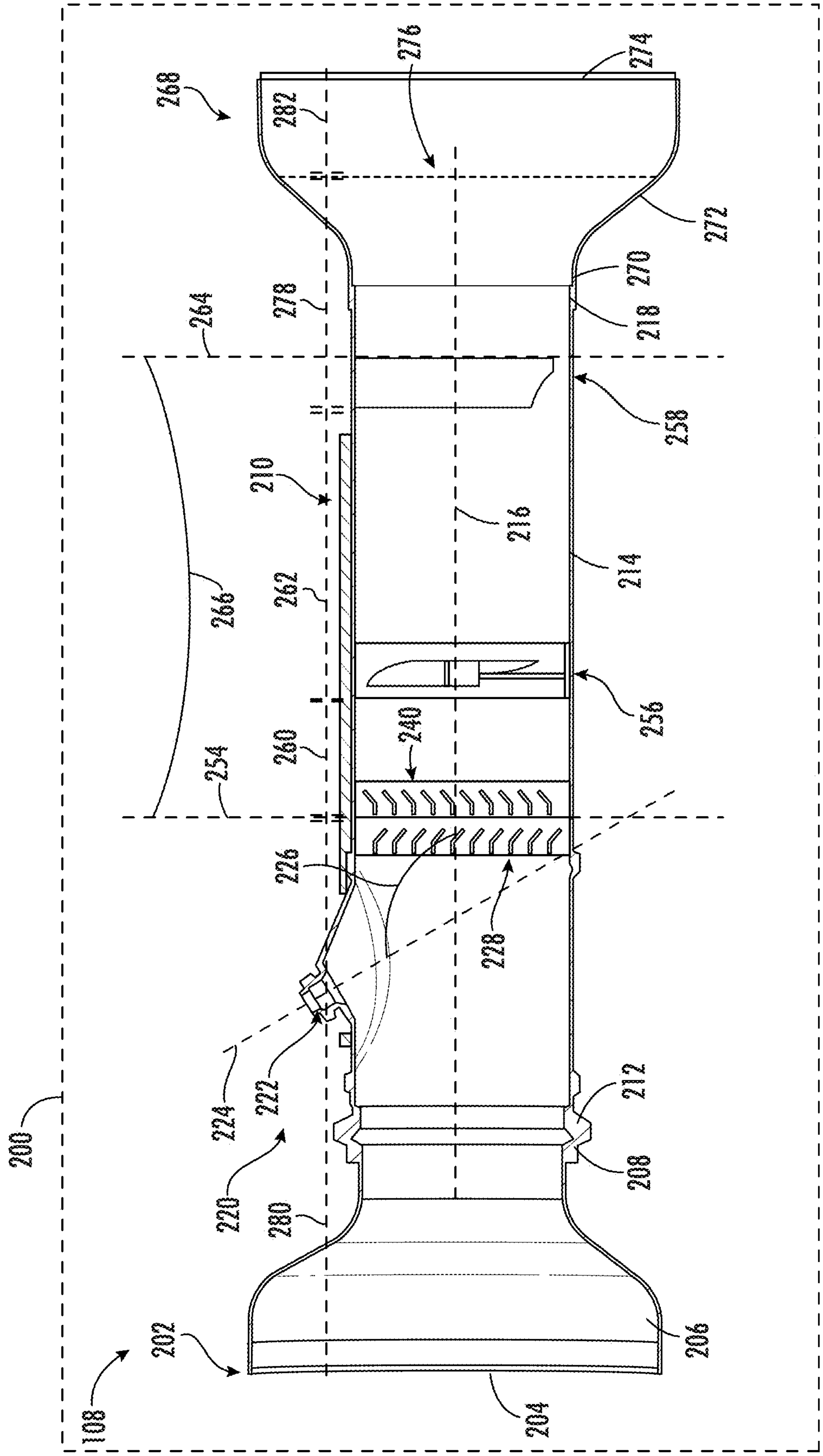
FIG. 2 is a cross-sectional view of an example decomposition chamber for an aftertreatment system.

FIG. 2 illustrates the decomposition chamber 108, according to an example embodiment. FIG. 2 is a cross-sectional view of the decomposition chamber 108 taken along a reference plane 200. The reference plane 200 bisects the decomposition chamber 108.

The decomposition chamber 108 includes an inlet fitting 202 (e.g., connector, section, etc.). The inlet fitting 202 is configured to receive exhaust and guide the exhaust into the decomposition chamber 108. The inlet fitting 202 includes an upstream inlet opening 204, an inlet body 206 that extends from the upstream inlet opening 204 and a downstream inlet opening 208. An area of the upstream inlet opening 204 is greater than an area of the downstream inlet opening 208.

The decomposition chamber 108 includes a conduit 210 configured to couple with the inlet fitting 202 via the downstream inlet opening 208. For example, the conduit 210 has an inlet 212. The conduit 210 is coupled with the downstream inlet opening 208 via the inlet 212. The conduit 210 has a conduit wall 214. The conduit wall 214 extends from the inlet 212. The conduit 210 is centered on a conduit axis 216. The conduit axis 216 extends in the reference plane 200. The conduit axis 216 extends between the inlet 212 and an outlet 218 of the conduit 210.

Figure 3:
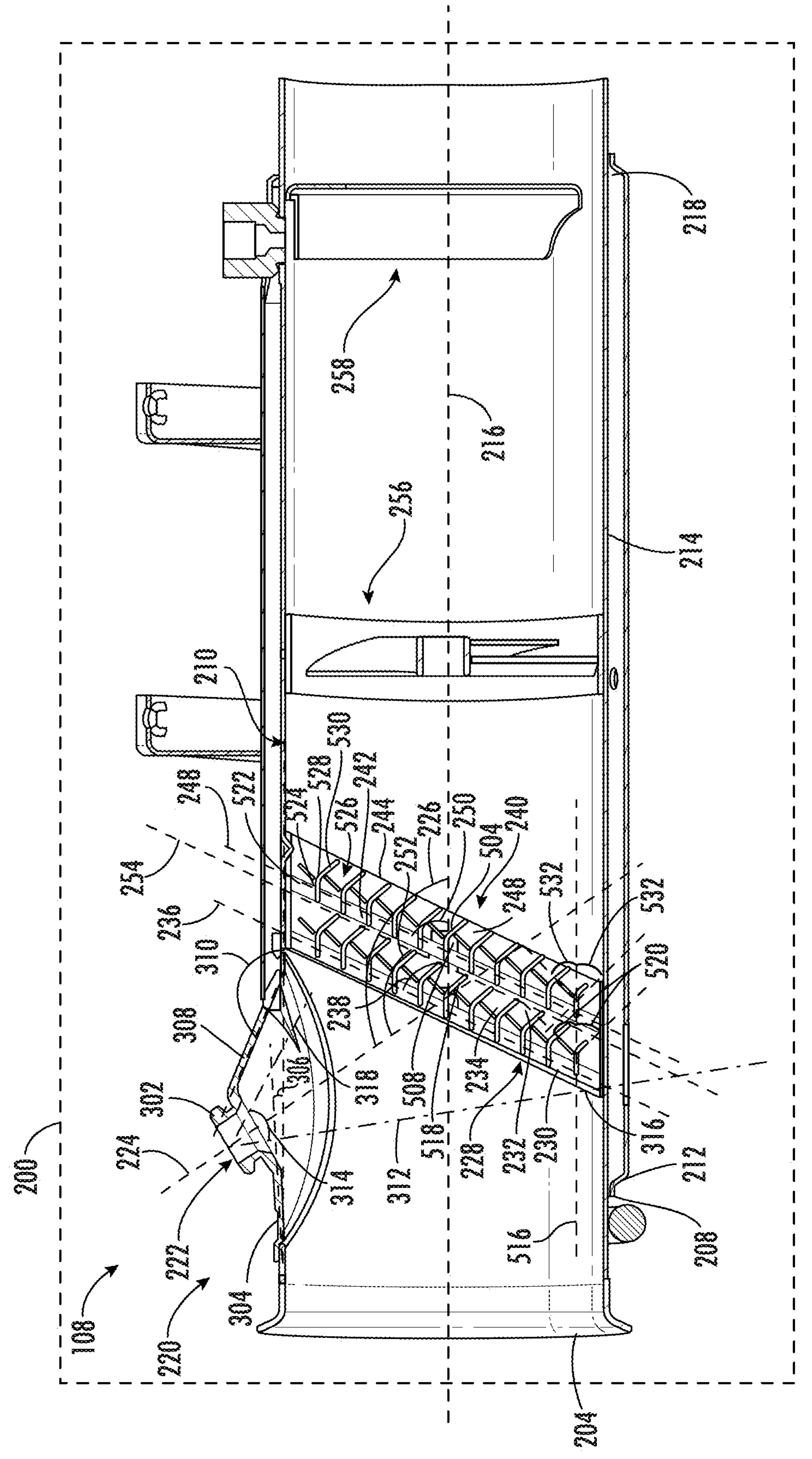
FIG. 3 is a cross-sectional view of a portion of the decomposition chamber of FIG. 2.
Figure 4:
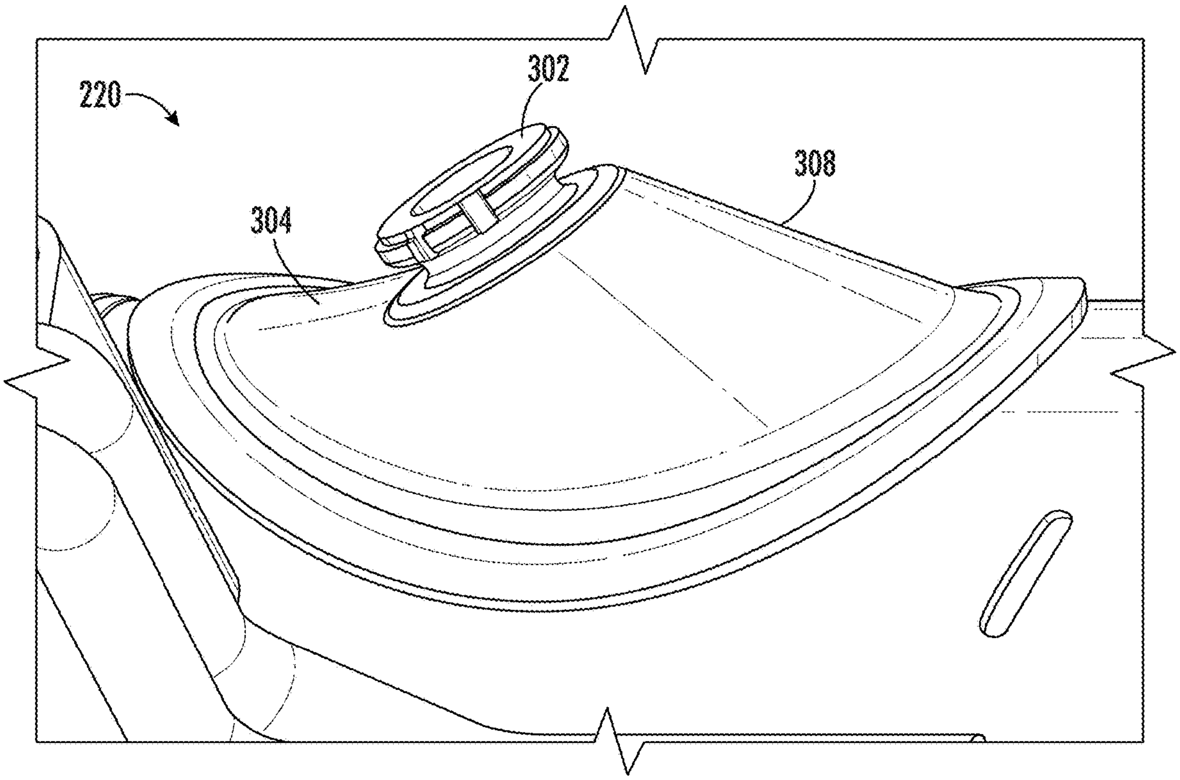
FIG. 4 is a top perspective view of a portion of the decomposition chamber of FIG. 2.

The decomposition chamber 108 includes a doser mount 220. FIGS. 3 and 4 illustrate the doser mount 220 according to an example embodiment. The doser mount 220 facilitates positioning of a dosing module 112 such that the dosing module 112 can provide reductant to the exhaust flowing through the decomposition chamber 108. The doser mount 220 is coupled to the conduit 210. For example, the doser mount 220 is coupled to an outer surface of the conduit wall 214.

The doser mount 220 includes an injection opening 222 that provides a path for reductant to enter the conduit 210. The injection opening 222 is centered on an injection axis 224. The injection axis 224 extends in the reference plane 200. The injection axis 224 may extend in other planes (e.g., planes angularly offset relative to the reference plane 200, planes angularly offset relative to a cross-sectional view, etc.). The injection axis 224 is oriented at an injection angle 226 relative to the conduit axis 216. For example, the injection angle 226 may be between 105 degrees and 165 degrees, inclusive, between the injection axis 224 and the conduit axis 216 (e.g., when measured in the clockwise direction from the injection axis 224 to the conduit axis 216 in the reference plane 200). For example, the injection angle may be approximately 120 degrees (e.g., +/−10%). In some embodiments, the injection angle 226 may be between 110 degrees and 165 degrees, inclusive, 120 degrees and 150 degrees, inclusive, 105 degrees and 140 degrees, inclusive, 130 degrees and 160 degrees, inclusive, or 130 degrees and 140 degrees, inclusive, among others.

As shown in FIGS. 3 and 4, the doser mount 220 includes a connection port 302 configured to facilitate coupling of the dosing module 112 to the doser mount 220. The connection port 302 defines the injection opening 222.

The doser mount 220 includes an upstream wall 304 that extends from the connection port 302 toward the inlet 212 of the conduit 210. In the reference plane 200, at least a portion of the upstream wall 304 is oriented at a first mount angle 306 relative to the conduit axis 216. For example, the first mount angle 306 may be between 0 degrees and 10 degrees, inclusive, between the upstream wall 304 and the conduit axis 216 (e.g., when measured in a counterclockwise direction from the conduit axis 216 to the upstream wall 304 in the reference plane 200). For example, the first mount angle 306 may be approximately 4.26 degrees (e.g., +/−10%). In some embodiments, the first mount angle 306 may be between 0 degrees and 5 degrees inclusive, 2 degrees and 8 degrees, inclusive, 3 degrees and 7 degrees, inclusive, or 4 degrees and 6 degrees, inclusive, among others.

The doser mount 220 includes downstream wall 308 that extends from the connection port 302 toward the outlet 218 of the conduit 210. In the reference plane 200, at least a portion of the downstream wall is oriented at a second mount angle 310 relative to the conduit axis 216. For example, the second mount angle 310 may be between 135 degrees and 175 degrees, inclusive, between the downstream wall and the conduit axis 216 (e.g., when measured in a counterclockwise direction from the conduit axis 216 to the downstream wall 308 in the reference plane 200). For example, the second mount angle 310 may be approximately 157.31 degrees (e.g., +/−10%). In some embodiments, the second mount angle 310 may be between 135 degrees and 140 degrees, inclusive, 140 degrees and 175 degrees, inclusive, 135 degrees and 155 degrees, inclusive, or 140 degrees and 150 degrees, inclusive, among others.

Figure 5:
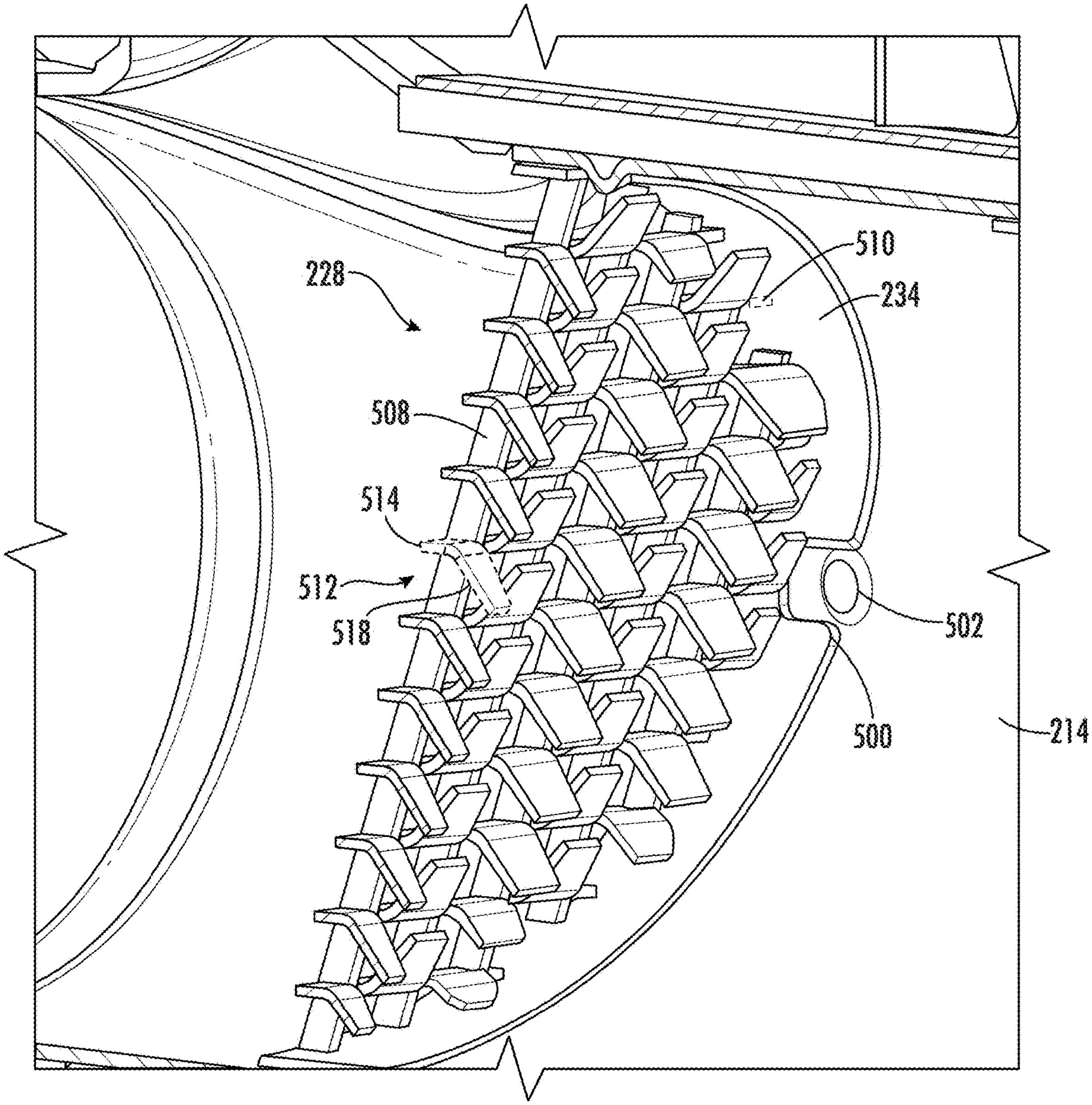
FIG. 5 is a perspective cross-sectional view of a portion of the decomposition chamber of FIG. 2.

Referring to FIG. 3, the decomposition chamber 108 includes a first mixing plate 228. FIGS. 3 and 5 illustrate the first mixing plate 228 according to an example embodiment. The first mixing plate 228 is disposed in the conduit 210. The first mixing plate 228 includes a first upstream edge 230, a first downstream edge 232, and a first plate wall 234 that extends between the first upstream edge 230 and the first downstream edge 232. An outer surface of the first plate wall 234 interfaces with an inner surface of the conduit wall 214.

The decomposition chamber 108 also includes a second mixing plate 240. The second mixing plate 240 provides a mechanism, in addition to the first mixing plate 228, to provide mixing. The second mixing plate 240 is identical to the first mixing plate 228, as shown in FIG. 5. The second mixing plate 240 is disposed in the conduit 210, downstream of the first mixing plate 228. As is explained in more detail herein, a distance (e.g., separation, etc.) between the first mixing plate 228 and the second mixing plate 240 may be relatively small (e.g., <10% of a diameter of the conduit 210, etc.). The first mixing plate 228 is parallel to the second mixing plate 240 (e.g., an upstream edge of the first mixing plate 228 is disposed along a first plane and an upstream edge of the second mixing plate 240 is disposed along a second plane that is parallel to the first plane).

The second mixing plate 240 includes a second upstream edge 242, a second downstream edge 244, and a second plate wall 246 that extends between the second upstream edge 242 and the second downstream edge 244. An outer surface of the second plate wall 246 interfaces with an inner surface of the conduit wall 214. In various embodiments, the first downstream edge 232 is separated from the second upstream edge 242 by a distance that is less than 100 millimeters (e.g., the first downstream edge 232 may be separated from the second upstream edge 242 by between 0 millimeters and 100 millimeters, etc.). For example, the first downstream edge 232 may be separated from the second upstream edge 242 by between 0 millimeters and 30 millimeters, inclusive. In another example, the first downstream edge 232 may be separated from the second upstream edge 242 by less than 50 millimeters. In other embodiments, the first downstream edge 232 is separated from the second upstream edge 242 by less than 10% of the diameter of the conduit 210. For example, the first downstream edge 232 may be separated from the second upstream edge 242 by between 2% of the diameter of the conduit 210 and 8% of the diameter of the conduit 210, inclusive. In another example, the first downstream edge 232 may be separated from the second upstream edge 242 by less than 5% of the diameter of the conduit 210.

Figure 13:
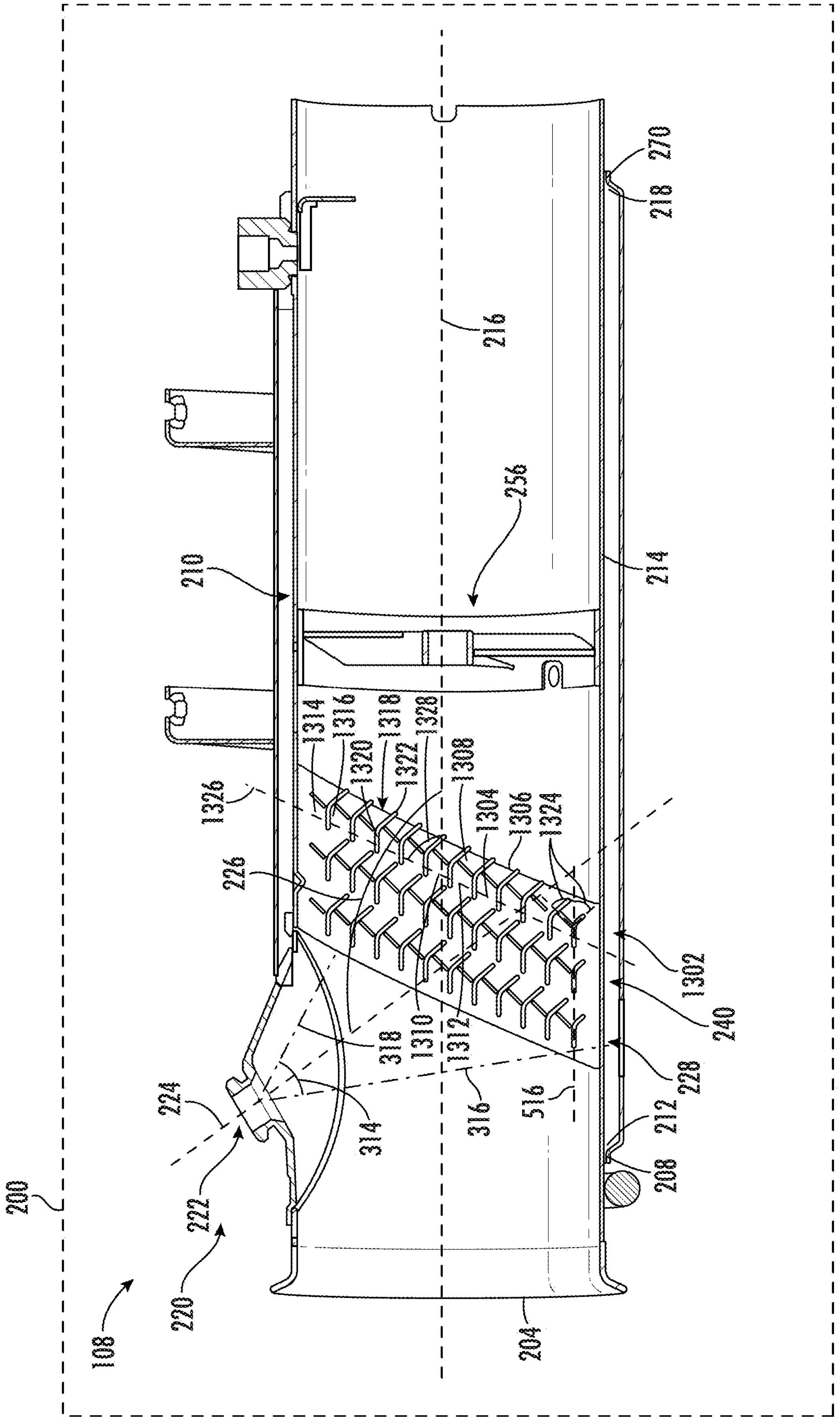
FIG. 13 is a cross-sectional view of a portion of an example decomposition chamber for an aftertreatment system.
Figure 14:
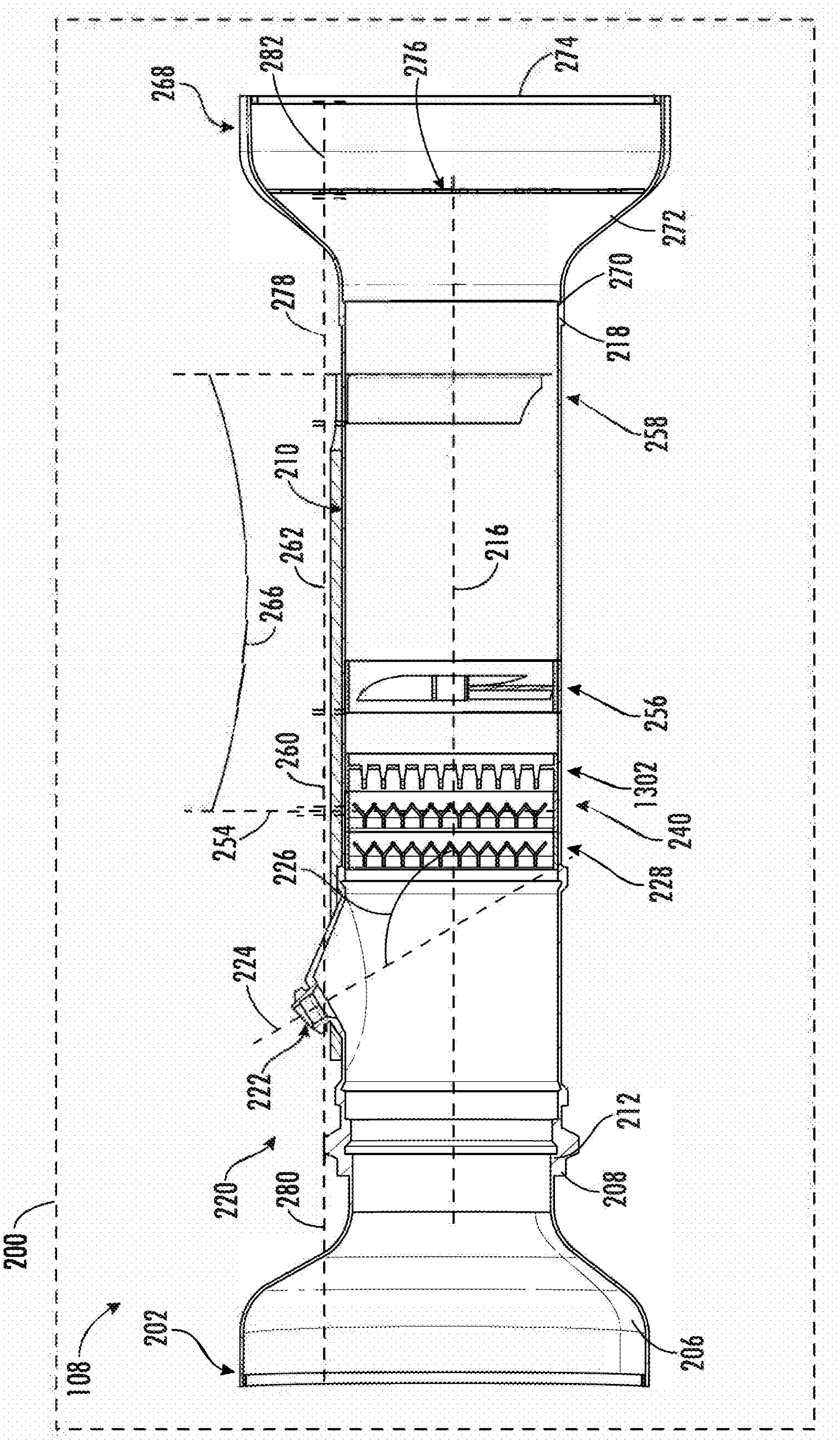
FIG. 14 is a cross-sectional view of an example decomposition chamber for an aftertreatment system.
Figure 15:
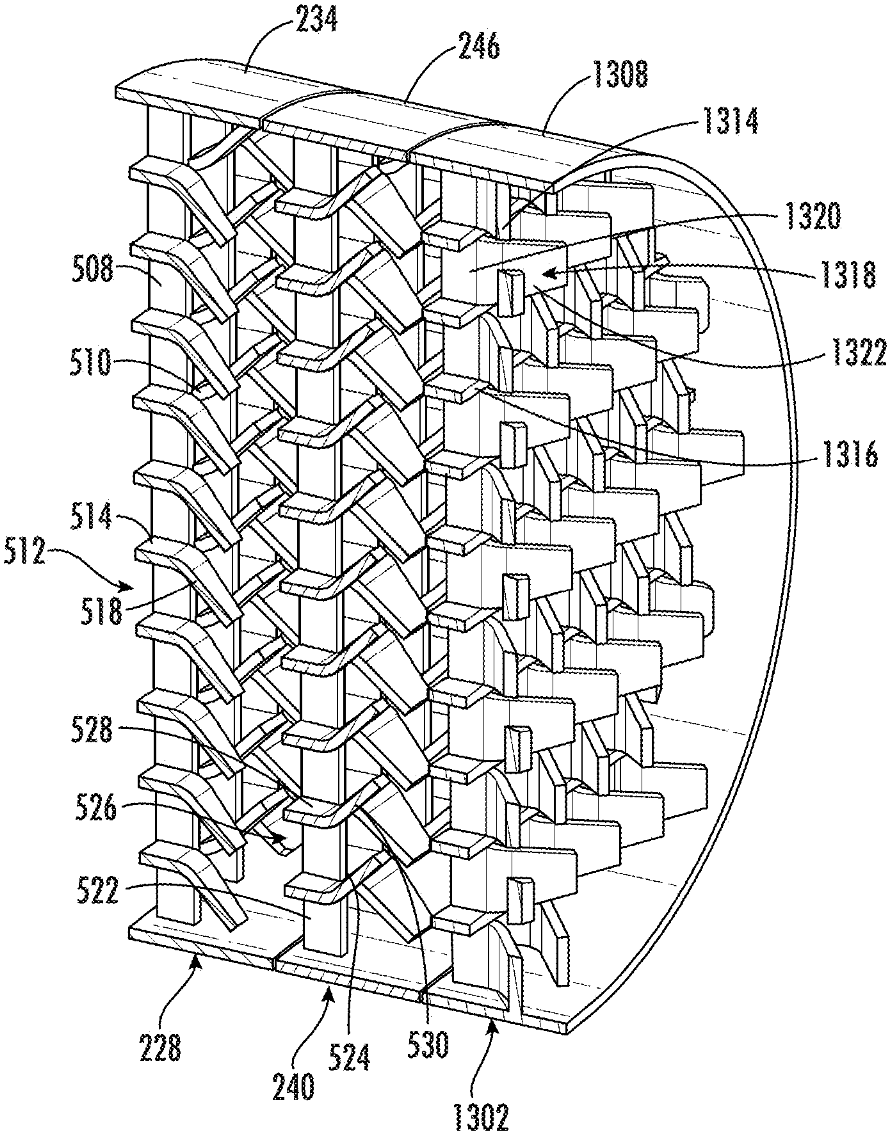
FIG. 15 is a perspective view of a portion of the decomposition chamber shown in FIG. 14.

In some embodiments, the decomposition chamber 108 also includes a third mixing plate 1302, as shown in FIGS. 13-15. The third mixing plate 1302 provides a mechanism, in addition to the first mixing plate 228 and the second mixing plate 240, to provide mixing. In some embodiments, the third mixing plate 1302 is identical to the first mixing plate 228 and the second mixing plate, as shown in FIG. 13. The third mixing plate 1302 is disposed in the conduit 210, downstream of the first mixing plate 228 and the second mixing plate 240. As is explained in more detail herein, a distance (e.g., separation, etc.) between the second mixing plate 240 and the third mixing plate 1302 may be relatively small (e.g., <10% of a diameter of the conduit 210, etc.). The third mixing plate 1302 is parallel to the first mixing plate 228 and the second mixing plate 240 (e.g., an upstream edge of the first mixing plate 228 is disposed along a first plane, an upstream edge of the second mixing plate 240 is disposed along a second plane, and an upstream edge of the third mixing plate 1302 is disposed along a third plane, the first plane, second plane and the third plane are parallel).

The third mixing plate 1302 includes a third upstream edge 1304, a third downstream edge 1306, and a third plate wall 1308 that extends between the third upstream edge 1304 and the third downstream edge 1306. An outer surface of the third plate wall 1308 interfaces with an inner surface of the conduit wall 214. In various embodiments, the second downstream edge 244 is separated from the third upstream edge 1304 by a distance that is less than 100 millimeters (e.g., the second downstream edge 244 may be separated from the third upstream edge 1304 by between 0 millimeters and 100 millimeters, etc.). For example, the second downstream edge 244 may be separated from the third upstream edge 1304 by between 0 millimeters and 30 millimeters, inclusive. In another example, the second downstream edge 244 may be separated from the third upstream edge 1304 by less than 50 millimeters. In other embodiments, the second downstream edge 244 is separated from the third upstream edge 1304 by less than 10% of the diameter of the conduit 210. For example, the second downstream edge 244 may be separated from the third upstream edge 1304 by between 2% of the diameter of the conduit 210 and 8% of the diameter of the conduit 210, inclusive. In another example, the second downstream edge 244 may be separated from the third upstream edge 1304 by less than 5% of the diameter of the conduit 210.

As shown in FIG. 5, the first mixing plate 228 includes at least one first plate locating feature 500 configured to facilitate proper placement and orientation of the first mixing plate 228 in the conduit 210 during installation. For example, the conduit 210 may have a first plate locating element 502 that corresponds with the first plate locating feature 500 of the first mixing plate 228. The first plate locating feature 500 and the first plate locating element 502 can be any element or feature configured to facilitate positioning of the first mixing plate 228. For example, the first plate locating element 502 may be a projection and the first plate locating feature 500 may be a slot or recess configured to receive the projection. Therefore, the first mixing plate 228 may be prevented from being secured in the conduit 210 until the first plate locating feature 500 is aligned with and engages with the first plate locating element 502. The first plate locating feature 500 and the first plate locating element 502 can also prevent unauthorized components from being disposed in the conduit 210. For example, the first mixing plate 228 without a first plate locating feature 500 that corresponds with a first plate locating element 502 of the conduit 210 will not be able to be installed in the conduit 210. The first mixing plate 228 can have any number of first plate locating features 500. The various first plate locating features 500 can all be the same or can be different. The first plate locating feature 500 can be in or on the first plate wall 234.

The second mixing plate 240 includes at least one second plate locating feature 504 configured to facilitate proper placement and orientation of the second mixing plate 240 in the conduit 210 during installation. For example, the conduit 210 may have a second plate locating element 506 that corresponds with the second plate locating feature 504 of the second mixing plate 240. The second plate locating feature 504 and the second plate locating element 506 can be any element or feature configured to facilitate positioning of the second mixing plate 240. For example, the second plate locating element 506 may be a projection and the second plate locating feature 504 may be a slot or recess configured to receive the projection. Therefore, the second mixing plate 240 may be prevented from being secured in the conduit 210 until the second plate locating feature 504 is aligned with and engages with the second plate locating element 506. The second plate locating feature 504 and the second plate locating element 506 can also prevent unauthorized components from being disposed in the conduit 210. For example, the second mixing plate 240 without a second plate locating feature 504 that corresponds with a second plate locating element 506 of the conduit 210 will not be able to be installed in the conduit 210. The second mixing plate 240 can have any number of second plate locating features 504. The various second plate locating features 504 can all be the same or can be different. The second plate locating feature 504 can be in or on the second plate wall 246.

In embodiments that include a third mixing plate 1302, the third mixing plate 1302 includes at least one third plate locating feature 1310 configured to facilitate proper placement and orientation of the third mixing plate 1302 in the conduit 210 during installation, as shown in FIG. 13. For example, the conduit 210 may have a third plate locating element 1312 that corresponds with the third plate locating feature 1310 of the third mixing plate 1302. The third plate locating feature 1310 and the third plate locating element 1312 can be any element or feature configured to facilitate positioning of the third mixing plate 1302. For example, the third plate locating element 1312 may be a projection and the third plate locating feature 1310 may be a slot or recess configured to receive the projection. Therefore, the third mixing plate 1302 may be prevented from being secured in the conduit 210 until the third plate locating feature 1310 is aligned with and engages with the third plate locating element 1312. The third plate locating feature 1310 and the third plate locating element 1312 can also prevent unauthorized components from being disposed in the conduit 210. For example, the third mixing plate 1302 without a third plate locating feature 1310 that corresponds with a third plate locating element 1312 of the conduit 210 will not be able to be installed in the conduit 210. The third mixing plate 1302 can have any number of third plate locating features 1310. The various third plate locating features 1310 can all be the same or can be different. The third plate locating feature 1310 can be in or on the third plate wall 1308.

As shown in FIG. 5, the first mixing plate 228 includes a plurality of first vertical crossmembers 508. A first end of a first vertical crossmember 508 can interface with the first plate wall 234 at a first location and a second end of the first vertical crossmember 508 can interface with the first plate wall 234 at a second location. The first vertical crossmembers 508 are parallel with each other. The first mixing plate 228 includes a plurality of first transverse crossmembers 510 (e.g., the first transverse cross member 510 outlined with the dotted line). A first end of a first transverse crossmember 510 can interface with the first plate wall 234 at a first location and a second end of the first transverse crossmembers 510 can interface with the first plate wall 234 at a second location. The first transverse crossmembers 510 are parallel with each other. The first transverse crossmembers 510 extend in a direction perpendicular to the first vertical crossmembers 508. Each of the first transverse crossmembers 510 is coupled to at least one of the first vertical crossmembers 508. It should be understood that the term "vertical" as used in reference to the plurality of first vertical crossmembers 508 need not be vertical with respect to the direction of gravity. Rather, "vertical" is used as a relative term to distinguish the direction of the first vertical crossmembers 508 from the direction of the first transverse crossmembers 510.

The first mixing plate 228 includes a plurality of first deflectors 512. Each of the first deflectors 512 is a part of or coupled to at least one of the first vertical crossmembers 508 or the first transverse crossmembers 510. A first deflector 512 includes a first upstream portion 514 (e.g., the first upstream portion 514 outlined with the dotted line). The first upstream portion 514 is part of or coupled to a first vertical crossmember 508 of a first transverse crossmember 510. The first upstream portion 514 defines a deflector plane 516. As shown in FIG. 3, in the reference plane 200, the deflector plane 516 is parallel to the conduit axis 216. The first upstream portion 514 is configured to guide the reductant introduced into the decomposition chamber 108 via the doser mount 220 to mix with the exhaust.

The first deflector 512 includes a first downstream portion 518 (e.g., the first downstream portion 518 outlined with the dotted line) that extends to the first upstream portion 514. In the reference plane 200, the first downstream portion 518 is oriented at a first deflector angle 520 relative to the deflector plane 516 (and the conduit axis 216). For example, the first deflector angle 520 may be between 10 degrees and 90 degrees, inclusive, between the first downstream portion 518 and the deflector plane 516. For example, the first deflector angle 520 may be approximately 90 degrees (e.g., +/−10%). In some embodiments, the first deflector angle 520 may be between 10 degrees and 35 degrees, inclusive, 35 degrees and 80 degrees, inclusive, 20 degrees and 70 degrees, inclusive, 30 degrees and 60 degrees, inclusive, or 40 degrees and 50 degrees, inclusive, among others. As shown in FIGS. 2 and 5, a first downstream portion 518 of a first deflector 512 extends in a first direction (e.g., below the deflector plane 516 at the first deflector angle 520. The direction of the first downstream portion 518 of the first deflectors 512 coupled with a first transverse crossmember 510 may alternate such that a first downstream portion 518 extends in a different direction than adjacent first downstream portions 518.

As shown in FIGS. 2 and 3, the first mixing plate 228 defines a first plate plane 236. The plurality of first vertical crossmembers 508 extend in the first plate plane 236. In some embodiments, in the reference plane 200, the first plate plane 236 may be oblique (e.g., angled relative to, not perpendicular with, not parallel to, not perpendicular with and not parallel to) to the conduit axis 216. In some embodiments, in the reference plane 200, the first plate plane 236 may be perpendicular to the conduit axis 216.

In the reference plane 200, the first plate plane 236 is oriented at a first plate angle 238 relative to the conduit axis 216. For example, the first plate angle 238 may be between 30 degrees and 90 degrees, inclusive, between the first plate plane 236 and the conduit axis 216 (e.g., when measured in a clockwise direction from the first plate plane 236 to the conduit axis 216 in the reference plane 200). For example, the first plate angle 238 may be approximately 60 degrees (e.g., +/−10%). In some embodiments, the first plate angle 238 may be between 30 degrees and 40 degrees, inclusive, 40 degrees and 80 degrees, inclusive, 30 degrees and 70 degrees, inclusive, 30 degrees and 60 degrees inclusive, or 40 degrees and 50 degrees, inclusive, among others.

With the first plate plane 236 oriented at the first plate angle 238, a first portion of the first upstream edge 230 is disposed further upstream than a second portion of the first upstream edge 230. For example, the first portion of the first upstream edge 230 is positioned at a first location along the conduit axis 216 and opposite the doser mount 220. The second portion of the first upstream edge 230 is positioned at a second location along the conduit axis 216 that is adjacent to and downstream of the doser mount 220.

As shown in FIG. 3, the second mixing plate 240 includes a plurality of second vertical crossmembers 522. A first end of a second vertical crossmembers 522 can interface with the second plate wall 246 at a first location and a second end of the second vertical crossmember 522 can interface with the second plate wall 246 at a second location. The second vertical crossmembers 522 are parallel with each other. The second vertical crossmembers 522 are parallel to the first vertical crossmembers 508. The second mixing plate 240 includes a plurality of second transverse crossmembers 524. A first end of a second transverse crossmember 524 can interface with the second plate wall 246 at a first location and a second end of the second transverse crossmembers 524 can interface with the second plate wall 246 at a second location. The second transverse crossmembers 524 are parallel with each other. The second transverse crossmember 524 are parallel to the first transverse crossmembers 510. The second transverse crossmembers 524 extend in a direction perpendicular to the second vertical crossmembers 522. Each of the second transverse crossmembers 524 is coupled to at least one of the second vertical crossmembers 522. It should be understood that the term "vertical" as used in reference to the plurality of second vertical crossmembers 522 need not be vertical with respect to the direction of gravity. Rather, "vertical" is used as a relative term to distinguish the direction of the second vertical crossmembers 522 from the direction of the second transverse crossmembers 524.

The second mixing plate 240 includes a second plurality of second deflectors 526. Each of the second deflectors 526 is a part of or coupled to at least one of the second vertical crossmembers 522 or the second transverse crossmembers 524. A second deflector 526 includes a second upstream portion 528. The second upstream portion 528 is part of or coupled to a second vertical crossmember 522 or a second transverse crossmember 524. The second upstream portion 528 defines a deflector plane 516. As shown in FIG. 3, in the reference plane 200, the deflector plane 516 is parallel to the conduit axis 216. The second upstream portion 528 is configured to guide the reductant introduced into the decomposition chamber 108 via the doser mount 220 to mix with the exhaust.

The second deflector 526 includes a second downstream portion 530 that extends to the second upstream portion 528. In the reference plane 200, the second downstream portion 530 is oriented at a second deflector angle 532 relative to the deflector plane 516 (and the conduit axis 216). For example, the second deflector angle 532 may be between 10 degrees and 90 degrees, inclusive, between the second downstream portion 530 and the deflector plane 516. For example, the second deflector angle 532 may be approximately 90 degrees (e.g., +/−10%). In some embodiments, the second deflector angle 532 may be between 10 degrees and 35 degrees, inclusive, 35 degrees and 80 degrees, inclusive, 20 degrees and 70 degrees, inclusive, 30 degrees and 60 degrees, inclusive, or 40 degrees and 50 degrees, inclusive, among others. As shown in FIG. 3, a second downstream portion 530 of a second deflector 526 extends in a first direction (e.g., below the deflector plane 516) at the second deflector angle 532. The direction of the second downstream portion 530 of the second deflectors 526 coupled with a second transverse crossmember 524 may alternate such that a second downstream portion 530 extends in a different direction than adjacent second downstream portions 530.

As shown in FIGS. 2 and 3, the second mixing plate 240 defines a second plate plane 248. The plurality of second vertical crossmembers 522 extend in the second plate plane 248. In some embodiments, in the reference plane 200, the second plate plane 248 may be oblique (e.g., angled relative to, not perpendicular with, not parallel to, not perpendicular with and not parallel to) to the conduit axis 216. In some embodiments, in the reference plane 200, the second plate plane 248 may be perpendicular to the conduit axis 216.

In the reference plane 200, the second plate plane 248 is oriented at a second plate angle 250 relative to the conduit axis 216. For example, the second plate angle 250 may be between 30 degrees and 90 degrees, inclusive, between the second plate plane 248 and the conduit axis 216 (e.g., when measured in a clockwise direction from the second plate plane 248 to the conduit axis 216 in the reference plane 200). For example, the second plate angle 250 may be approximately 60 degrees (e.g., +/−10%). In some embodiments, the second plate angle 250 may be between 30 degrees and 40 degrees, inclusive, 40 degrees and 80 degrees, inclusive, 30 degrees and 70 degrees, inclusive, 30 degrees and 60 degrees inclusive, or 40 degrees and 50 degrees, inclusive, among others.

With the second plate plane 248 oriented at the second plate angle 250, a first portion of the second upstream edge 242 is disposed further upstream than a second portion of the second upstream edge 242. For example, the first portion of the second upstream edge 242 is positioned at a third location along the conduit axis 216 and opposite the doser mount 220. The second portion of the second upstream edge 242 is positioned at a fourth location along the conduit axis 216 that is adjacent to, and downstream of the doser mount 220.

As shown in FIG. 13, the third mixing plate 1302 includes a plurality of third vertical crossmembers 1314. A first end of a third vertical crossmembers 1314 can interface with the third plate wall 1308 at a first location and a second end of the third vertical crossmember 1314 can interface with the third plate wall 1308 at a second location. The third vertical crossmembers 1314 are parallel with each other. The third vertical crossmembers 1314 are parallel to the first vertical crossmembers 508 and the second vertical crossmembers 522. The third mixing plate 1302 includes a plurality of third transverse crossmembers 1316. A first end of a third transverse crossmember 1316 can interface with the third plate wall 1308 at a first location and a second end of the third transverse crossmembers 1316 can interface with the third plate wall 1308 at a second location. The third transverse crossmembers 1316 are parallel with each other. The third transverse crossmembers 1316 are parallel with the second transverse crossmembers 524 and the first transverse crossmembers 510. The third transverse crossmembers 1316 extend in a direction perpendicular to the third vertical crossmembers 1314. Each of the third transverse crossmembers 1316 is coupled to at least one of the third vertical crossmembers 1314. It should be understood that the term "vertical" as used in reference to the plurality of third vertical crossmembers 1314 need not be vertical with respect to the direction of gravity. Rather, "vertical" is used as a relative term to distinguish the direction of the third vertical crossmembers 1314 from the direction of the third transverse crossmembers 1316.

The third mixing plate 1302 includes a plurality of third deflectors 1318. Each of the third deflectors 1318 is a part of or coupled to at least one of the third vertical crossmembers 1314 or the third transverse crossmembers 1316. In some embodiments, the third deflectors 1318 are rotated 90 degrees relative to the first deflectors 512 and the second deflectors 526, as shown in FIGS. 14 and 15. A third deflector 1318 includes a third upstream portion 1320. The third upstream portion 1320 is part of or coupled to a third vertical crossmember 1314 or a third transverse crossmember 1316. In some embodiments, the third upstream portion 1320 defines a deflector plane 516. As shown in FIG. 13, in the reference plane 200, the deflector plane 516 is parallel to the conduit axis 216. In some embodiments, the third upstream portion 1320 is rotated 90 degrees relative to the first upstream portion 514 and the second upstream portion 528, as shown in FIGS. 14 and 15. The third upstream portion 1320 is configured to guide the reductant introduced into the decomposition chamber 108 via the doser mount 220 to mix with the exhaust.

The third deflector 1318 includes a third downstream portion 1322 that extends to the third upstream portion 1320. In embodiments, in which the third upstream portion 1320 is rotated 90 degrees relative to the first upstream portion 514 and the second upstream portion 528, the third downstream portion 1322 is rotated 90 degrees relative to the first downstream portion 518 and the second downstream portion 520, as shown in FIGS. 14 and 15. In some embodiments, in the reference plane 200, the third downstream portion 1322 is oriented at a third deflector angle 1324 relative to the deflector plane 516 (and the conduit axis 216). For example, the third deflector angle 1324 may be between 10 degrees and 90 degrees, inclusive, between the third downstream portion 1322 and the deflector plane 516. For example, the third deflector angle 1324 may be approximately 90 degrees (e.g., +/−10%). In some embodiments, the third deflector angle 1324 may be between 10 degrees and 35 degrees, inclusive, 35 degrees and 80 degrees, inclusive, 20 degrees and 70 degrees, inclusive, 30 degrees and 60 degrees, inclusive, or 40 degrees and 50 degrees, inclusive, among others. As shown in FIG. 13, a third downstream portion 1322 of a third deflector 1318 extends in a first direction (e.g., below the deflector plane 516, right of the deflector plane 516) at the third deflector angle 1324. The direction of the third downstream portion 1322 of the third deflectors 1318 coupled with a third transverse crossmember 1316 may alternate such that a third downstream portion 1322 extends in a different direction than adjacent third downstream portions 1322.

As shown in FIGS. 13 and 14, the third mixing plate 1302 defines a third plate plane 1326. The plurality of third vertical crossmembers 1314 extend in the third plate plane 1326. In some embodiments, in the reference plane 200, the third plate plane 1326 may be oblique (e.g., angled relative to, not perpendicular with, not parallel to, not perpendicular with and not parallel to) to the conduit axis 216. In some embodiments, in the reference plane 200, the third plate plane 1326 may be perpendicular to the conduit axis 216, as shown in FIGS. 14 and 15.

In some embodiments, in the reference plane 200, in which the third deflectors 1318 are rotated 90 degrees, the third downstream portion 1322 is oriented at a third deflector angle 1324 relative to the third plate plane 1326. For example, the third deflector angle 1324 may be between 10 degrees and 90 degrees, inclusive, between the third downstream portion 1322 and the third plate plane 1326. For example, the third deflector angle 1324 may be approximately 90 degrees (e.g., +/−10%). In some embodiments, the third deflector angle 1324 may be between 10 degrees and 35 degrees, inclusive, 35 degrees and 80 degrees, inclusive, 20 degrees and 70 degrees, inclusive, 30 degrees and 60 degrees, inclusive, or 40 degrees and 50 degrees, inclusive, among others.

In the reference plane 200, the third plate plane 1326 is oriented at a third plate angle 1328 relative to the conduit axis 216. For example, the third plate angle 1328 may be between 30 degrees and 90 degrees, inclusive, between the third plate plane 1326 and the conduit axis 216 (e.g., when measured in a clockwise direction from the third plate plane 1326 to the conduit axis 216 in the reference plane 200). For example, the third plate angle 1328 may be approximately 60 degrees (e.g., +/−10%). In some embodiments, the third plate angle 1328 may be between 30 degrees and 40 degrees, inclusive, 40 degrees and 80 degrees, inclusive, 30 degrees and 70 degrees, inclusive, 30 degrees and 60 degrees inclusive, or 40 degrees and 50 degrees, inclusive, among others.

With the third plate plane 1326 oriented at the third plate angle 1328, a first portion of the third upstream edge 1304 is disposed further upstream than a second portion of the third upstream edge 1304. For example, the first portion of the third upstream edge 1304 is positioned at a third location along the conduit axis 216 and opposite the doser mount 220. The second portion of the third upstream edge 1304 is positioned at a fourth location along the conduit axis 216 that is adjacent to, and downstream of the doser mount 220.

In the reference plane 200, the injection axis 224 is oriented at a deflection angle 252 relative to a mixer plane 254 (e.g., the plane in which the plurality of first vertical crossmembers 508 and second vertical crossmember 522 extend, the plane in which the plurality of first vertical crossmembers 508, second vertical crossmembers 522, and third vertical crossmembers extend). For example, the deflection angle 252 may be between 10 degrees and 120 degrees, inclusive, between the mixer plane 254 and the injection axis 224 (e.g., when measured in a clockwise direction from the injection axis 224 to the mixer plane 254 in the reference plane 200). For example, the deflection angle 252 may be approximately 55 degrees (e.g., +/−10%). In some embodiments, the deflection angle 252 may be between 20 degrees and 40 degrees, inclusive, 60 degrees and 80 degrees, inclusive, 20 degrees and 80 degrees, inclusive, 80 degrees and 100 degrees, inclusive, or 60 degrees and 100 degrees, inclusive among others.

As shown in FIG. 3, the dosing module 112 can provide reductant to the exhaust within the conduit 210. The reductant can have a spray volume 312. The spray volume 312 can have the shape of a cone, for example. The spray volume can have a spray angle 314 such that the spray volume 312 has a first (e.g., lower) point of impingement 316 and a second (e.g., upper) point of impingement 318. An orientation and location of the first mixing plate 228 and the second mixing plate 240 can be at least partially based on spray angle 314 of the spray volume 312. In some embodiments, an orientation and location of the first mixing plate 228, the second mixing plate 240, and the third mixing plate 1302 can be at least partially based on spray angle 314 of the spray volume 312.

For example, the first mixing plate 228 can be positioned and/or oriented relative to the doser mount 220 such that the first point of impingement 316 of the spray volume 312 is coincident with the first mixing plate 228. For example, the second mixing plate 240 can be positioned and/or oriented relative to the doser mount 220 such that the first point of impingement 316 of the spray volume 312 is coincident with the second mixing plate 240. For example, the third mixing plate 1302 can be positioned and/or oriented relative to the doser mount 220 such that the first point of impingement 316 of the spray volume 312 is coincident with the third mixing plate 1302.

For example, the first mixing plate 228 and the second mixing plate 240 can be positioned along the conduit axis 216 and be oriented at a first plate angle 238 and a second plate angle 250 such that the first point of impingement 316 of the spray volume 312 contacts the first mixing plate 228 and the second mixing plate 240 and does not contact the inner surface of the conduit wall 214. In some embodiments, for example, the third mixing plate 1302 can be positioned along the conduit axis 216 and be oriented at a third plate angle 1328 such that the first point of impingement 316 of the spray volume 312 contacts the third mixing plate 1302 and does not contact the inner surface of the conduit wall 214.

The first point of impingement 316 can contact the first mixing plate 228 at any location along the first mixing plate 228. The first point of impingement 316 can contact the second mixing plate 240 at any location along the second mixing plate 240. In some embodiments, the first point of impingement 316 can contact the third mixing plate 1302 at any location along the third mixing plate 1302.

The first mixing plate 228 and the second mixing plate 240 can also be positioned relative to the doser mount 220 such that the second point of impingement 318 of the spray volume 312 is coincident with the first mixing plate 228 and the second mixing plate 240. For example, the first mixing plate 228 and the second mixing plate 240 can be positioned along the conduit axis 216 and be oriented at a first plate angle 238 and a second plate angle 250 such that the second point of impingement 318 of the spray volume 312 contacts the first mixing plate 228 and the second mixing plate 240 and does not contact the inner surface of the conduit wall 214.

In some embodiments, the third mixing plate 1302 can also be positioned relative to the doser mount 220 such that the second point of impingement 318 of the spray volume 312 is coincident with the third mixing plate 1302. For example, the third mixing plate 1302 can be positioned along the conduit axis 216 and be oriented at a third plate angle 1328 such that the second point of impingement 318 of the spray volume 312 contacts the third mixing plate 1302 and does not contact the inner surface of the conduit wall 214.

The deflection angle 252 can be determined such that the spray volume 312 covers as much of the first mixing plate 228 (or the first plate plane 236) and the second mixing plate 240 (or second plate plane 248) as possible. For example, the deflection angle 252 is configured such that the spray volume 312 covers a majority of a surface area of the first mixing plate 228 and the second mixing plate 240. The deflection angle 252 is configured to achieve an even spray distribution across the first mixing plate 228 and the second mixing plate 240.

In some embodiments, the deflection angle 252 can be determined such that the spray volume 312 covers as much of the third mixing plate 1302 (or the third plate plane 1326) as possible. For example, the deflection angle 252 is configured such that the spray volume 312 covers a majority of a surface area of the third mixing plate 1302. The deflection angle 252 is configured to achieve an even spray distribution across the third mixing plate 1302.

Figure 6:
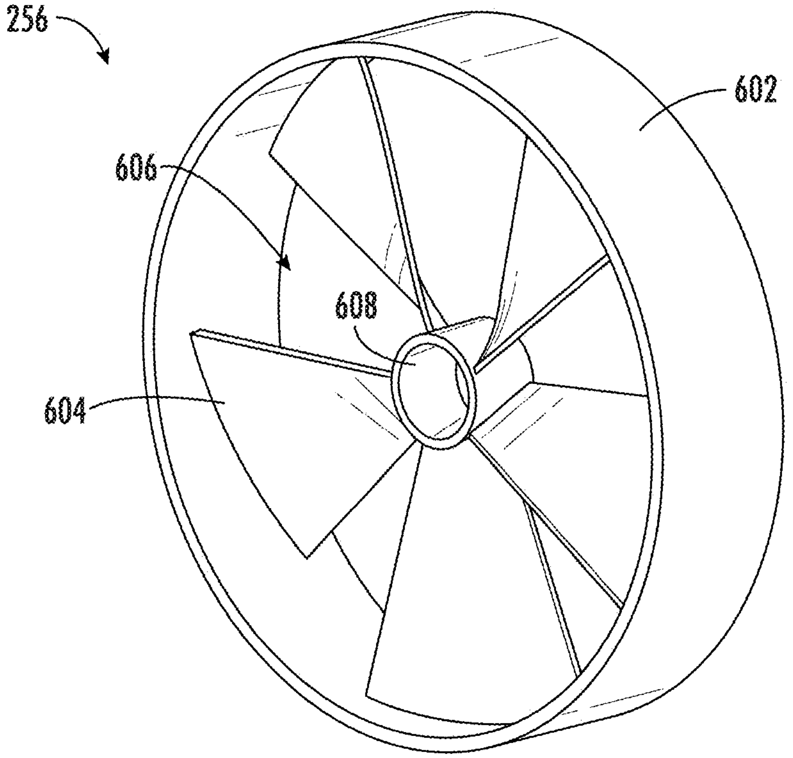
FIG. 6 is a perspective view of an example vane mixer for a decomposition chamber.
Figure 7:
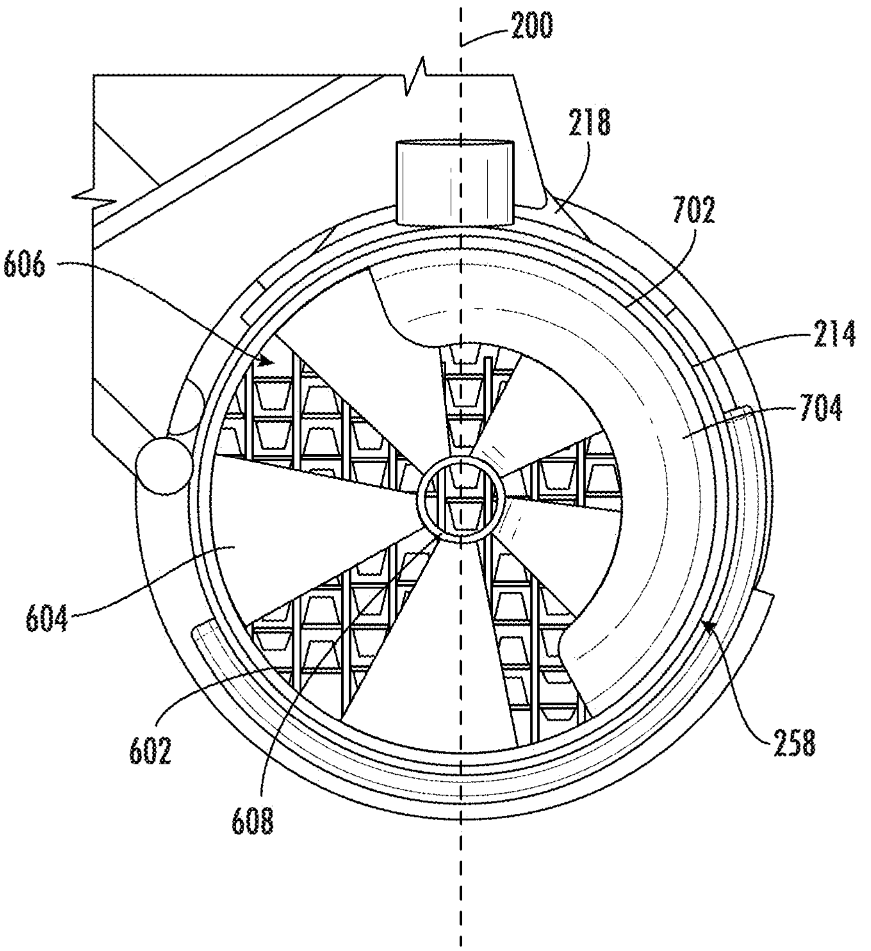
FIG. 7 is an end view of a portion of the decomposition chamber shown in FIG. 2 viewed from downstream looking upstream.

Referring back to FIG. 2, the decomposition chamber 108 includes a vane mixer 256 (e.g., mixing assembly, etc.). The vane mixer 256 is disposed in the conduit downstream of the first mixing plate 228 and the second mixing plate 240. In some embodiments, the vane mixer 256 is disposed in the conduit downstream of the first mixing plate 228, the second mixing plate 240, and the third mixing plate 1302, as shown in FIG. 14. FIGS. 6 and 7 illustrate the vane mixer 256 according to an example embodiment. The vane mixer 256 includes a mixer wall 602. The mixer wall 602 may be coupled to the inner surface of the conduit wall 214.

As shown in FIGS. 6 and 7, the vane mixer 256 includes a plurality of vanes 604 (e.g., blades, etc.). The vanes 604 define a plurality of vane apertures 606 therebetween. The vane mixer 256 includes a hub 608. Each of the vanes 604 is coupled to the mixer wall 602 and the hub 608. In some embodiments, the vane mixer 256 may not include the mixer wall 602. In some embodiments, the vanes 604 may be coupled directly to the conduit wall 214. The exhaust in the decomposition chamber 108 can flow through the vane mixer 256 via the vane apertures 606, the exhaust is caused to rotate downstream of the vane mixer 256. This rotation facilitates the mixing of the exhaust and reductant.

The vane mixer 256 includes a plurality of vanes 604. For example, the vane mixer 256 may include five vanes 604 equally spaced within the mixer wall 602. Each vane 604 may be oriented such that a first side edge of a vane 604 is disposed upstream from a second side edge of the vane 604.

In some embodiments, the hub 608 is configured to facilitate flow of the exhaust through the vane mixer 256 (e.g., such that a portion of the exhaust can flow through the hub 608 without flowing through a vane aperture 606). In such embodiments, the exhaust flowing through the hub 608 may aid in propelling the exhaust gas downstream of the vane mixer 256, thereby reduce a backpressure of the decomposition chamber 108.

Figure 8:
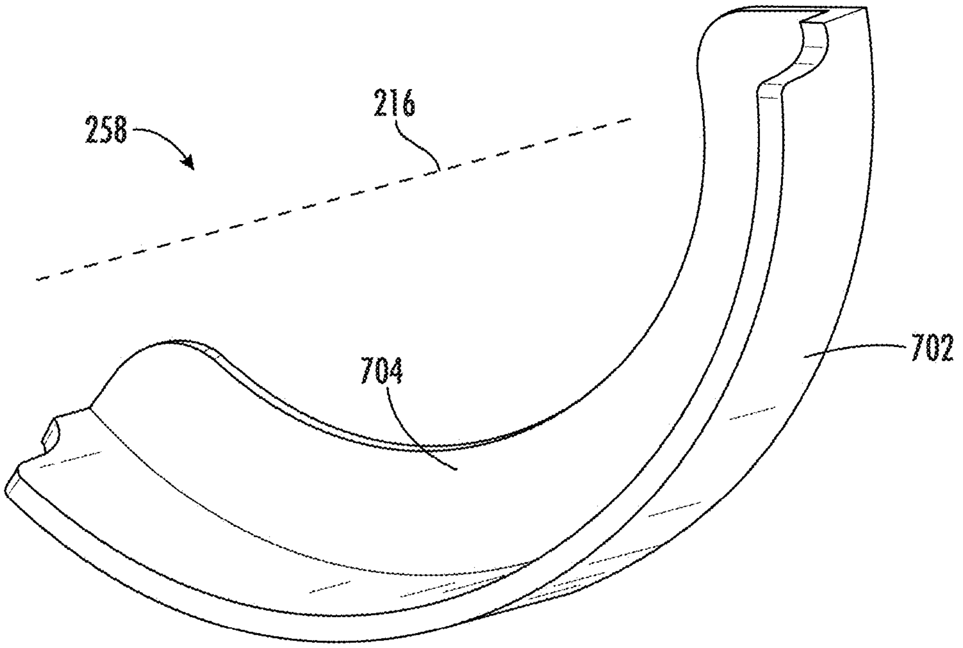
FIG. 8 is a perspective view of an example baffle for a decomposition chamber.

The decomposition chamber 108 includes a baffle 258. The baffle 258 is disposed in the conduit 210. The baffle 258 is disposed downstream of the vane mixer 256. FIGS. 7 and 8 illustrate the baffle 258 according to an example embodiment. The baffle 258 is configured to make the flow distribution of the exhaust and reductant mixture more uniform downstream of the vane mixer 256. For example, a location of the baffle 258 can be based on a location within the conduit 210 where particulates tend to flow toward to disrupt the momentum and trajectory of those particles and create a more uniform flow.

The baffle 258 includes a first portion, shown as baffle wall 702. The baffle wall 702 extends along a portion of an inner surface of the conduit wall 214. The baffle wall 702 may be coupled to the inner surface of the conduit wall 214. The baffle wall 702 may have a shape of a portion of a cylinder. For example, the baffle wall 702 may have a partial annular shape (e.g., a partial ring or disk shape). The baffle wall 702 may have a semi-circular shape such that it only defines a perimeter of a portion of a circle.

The baffle 258 includes a second portion, shown as baffle flange 704. The baffle flange 704 may have a shape of a portion of an annular object (e.g., an annular disk). The baffle flange 704 extends radially inward from the baffle wall 702 toward the conduit axis 216. The baffle flange 704 may extend from an edge of the baffle wall 702 or at a location between the edges of the baffle wall 702 (e.g., the baffle wall 702 may extend upstream and/or downstream of the baffle flange 704). In some embodiments the reference plane 200 bisects the baffle flange 704. In some embodiments, the reference plane 200 intersects one end of the baffle flange 704 at two locations (e.g., proximate ends of the baffle flange 704). In other embodiments, the reference plane 200 extends through a midsection of the baffle flange 704.

The baffle 258 is disposed further away from the vane mixer 256 than the vane mixer 256 is from the first mixing plate 228. For example, the vane mixer 256 is disposed a first distance 260 from the first mixing plate 228 along the conduit axis 216. The first distance 260 is measured from a first downstream edge 232 of the first mixing plate 228 to an upstream edge of the vane mixer 256. The baffle 258 is disposed a second distance 262 from the vane mixer 256 along the conduit axis 216. The second distance 262 is measured from the upstream edge of the vane mixer 256 to an upstream edge of the baffle 258. The second distance 262 is greater than the first distance 260. For example, the first distance 260 can be between 80 mm and 90 mm (e.g., approximately 88.95 mm, etc.). The second distance 262 can be between 160 mm and 180 mm (e.g., approximately 168.8 mm, etc.).

As described above, the baffle 258 is disposed downstream of the vane mixer 256 to make the flow distribution more uniform by disrupting momentum and trajectory of some of the exhaust and reductant particles. However, no part of the baffle 258 (e.g., the baffle flange 704) is aligned with the hub 608. Therefore, the exhaust that flows through the hub 608 may avoid the baffle 258, which may reduce the backpressure in the decomposition chamber 108.

The baffle flange 704 is disposed along a baffle plane 264. The baffle plane 264 is perpendicular to the reference plane 200. In the reference plane 200, the mixer plane 254 (e.g., the plane in which the plurality of first vertical crossmembers 508 and second vertical crossmember 522 extend) is oriented at a mixer plane angle 266 relative to the baffle plane 264. For example, mixer plane angle 266 may be between 0 degrees and 80 degrees, inclusive, between the baffle plane 264 and the mixer plane 254 (e.g., when measured in a clockwise direction from the baffle plane 264 to the mixer plane 254 in the reference plane 200). In some embodiments, the mixer plane angle 266 may be between 0 degrees and 40 degrees, inclusive, 40 degrees and 80 degrees, inclusive, 20 degrees and 70 degrees, inclusive, 30 degrees and 60 degrees, inclusive, or 40 degrees and 50 degrees, inclusive, among others.

The orientation of the baffle 258 within the conduit 210 may be based on a location of the doser mount 220 For example, the baffle 258 extends only partially around the conduit axis 216. For example, the baffle 258 may extend between 160 degrees and 180 degrees (e.g., approximately 170.5 degrees, etc.) around the conduit axis 216. The reference plane 200 bisects the doser mount 220. As shown in FIG. 7, the baffle 258 is oriented in the conduit 210 such that the reference plane 200 extends through a portion of the baffle 258. The baffle 258 may be off-center such that a majority of the baffle 258 is disposed on a first side of the reference plane 200 and a minority of the baffle 258 is disposed on a second side of the reference plane 200.

Referring back to FIG. 2, the decomposition chamber 108 includes an outlet fitting 268 (e.g., connector, section, etc.). The outlet fitting 268 is configured to receive the exhaust from within the conduit 210 and guide the exhaust to a downstream component of the aftertreatment system 100 (e.g., the SCR catalyst member 110). The outlet fitting 268 includes an upstream outlet opening 270, an outlet body 272 that extends between the upstream outlet opening 270 and the downstream outlet opening 274. An area of the downstream outlet opening 274 is greater than an area of the upstream outlet opening 270.

The conduit 210 extends between the inlet fitting 202 and the outlet fitting 268. The outlet fitting 268 coupled with the conduit 210. For example, the conduit 210 couples with the upstream outlet opening 270 via the outlet 218 of the conduit 210.

Figure 9:
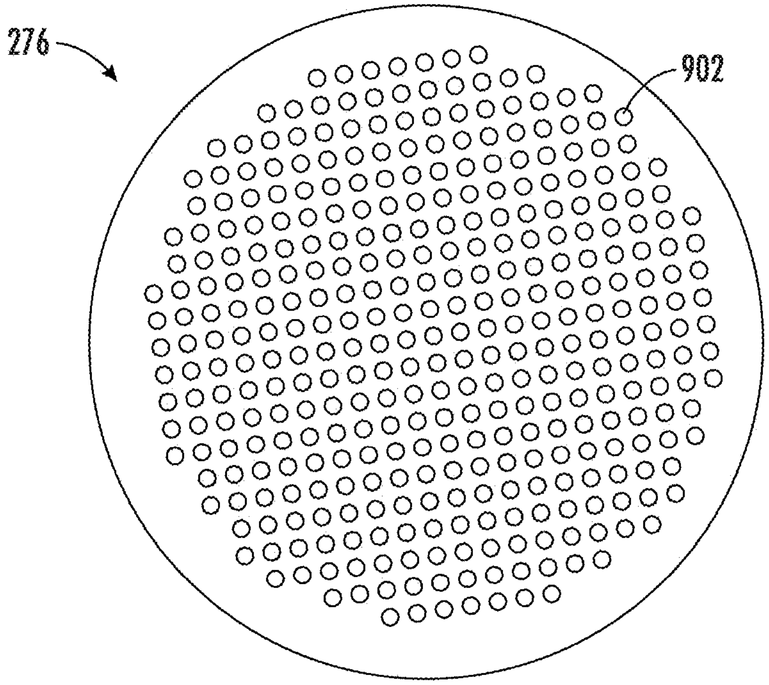
FIG. 9 is an end view of an example perforated plate for a decomposition chamber.

The decomposition chamber 108 includes a perforated plate 276. FIG. 9 illustrates the perforated plate 276 according to an example embodiment. The perforated plate 276 is configured to create a uniform flow of the exhaust and reductant mixture. This uniform flow may facilitate desirable operation of the catalyst member 110. As shown in FIG. 9, the perforated plate 276 may have a plurality of perforations 902. The perforations 902 may all be the same size or may have different sizes. The perforations 902 may be distributed symmetrically or asymmetrically across the perforated plate 276. For example, instead of being uniformly spaced about the perforated plate 276, the perforations 902 can be in clusters of different sizes that are not uniformly spaced about the perforated plate 276. The perforated plate 276 can have or define an asymmetrical array of perforations 902. The asymmetry of the perforations 902 can facilitate different amounts of fluid to flow through the perforated plate 276 at different locations.

The perforated plate 276 is disposed in the outlet fitting 268. At least a portion of the perimeter of the perforated plate 276 may interface with an inner surface of the outlet fitting 268. The perforated plate 276 may couple to the outlet fitting 268. The perforated plate 276 is disposed downstream of the vane mixer 256 and the baffle 258. The perforated plate 276 may be disposed a third distance 278 from the baffle 258 along the conduit axis 216. The third distance 278 is measured from the upstream edge of the baffle 258 to an upstream edge of the perforated plate 276. The third distance 278 may be greater than the first distance 260 and less than the second distance 262. For example, the third distance 278 may be between 120 mm and 140 mm (e.g., approximately 132.49 mm, etc.).

Referring back to FIG. 2, the first mixing plate 228, the second mixing plate 240, the vane mixer 256, the baffle 258, and the perforated plate 276 are disposed between the upstream inlet opening 204 of the inlet fitting 202 and the downstream outlet opening 274 of the outlet fitting 268. In some embodiments, the first mixing plate 228, the second mixing plate 240, third mixing plate 1302, the vane mixer 256, the baffle 258, and the perforated plate 276 are disposed between the upstream inlet opening 204 of the inlet fitting 202 and the downstream outlet opening 274 of the outlet fitting 268, as shown in FIG. 14. The mixer plane 254 (e.g., the plane in which the plurality of first vertical crossmembers 508 and second vertical crossmember 522 extend, the plane in which the plurality of first vertical crossmembers 508, second vertical crossmembers 522, and third vertical crossmembers 1314 extend) can be disposed a fourth distance 280 from the upstream inlet opening 204. The fourth distance 280 is measured from the upstream inlet opening 204 to the mixer plane 254. The fourth distance 280 can be greater than the first distance 260, the second distance 262, and the third distance 278. For example, the fourth distance 280 can be between 290 mm and 310 mm (e.g., approximately 303.78 mm, etc.).

The perforated plate 276 can be disposed a fifth distance 282 from the downstream outlet opening 274. The fifth distance 282 is measured from the upstream edge of the perforated plate 276 to the downstream outlet opening 274. The fifth distance 282 can be less than the first distance 260, the second distance 262, the third distance 278, and the fourth distance 280. For example, the fifth distance 282 can be between 50 mm and 70 mm (e.g., approximately 56.5 mm, etc.).

The decomposition chamber 108 can have a first ratio between the first distance 260 and the second distance 262. For example, the first ratio can be between 0.3 and 0.75 (e.g., approximately 0.53, etc.). The decomposition chamber 108 can have a second ratio between the first distance 260 and the third distance 278. For example, the second ratio can be between 0.5 and 0.8 (e.g., approximately 0.67, etc.). The decomposition chamber 108 can have a third ratio between the first distance 260 and the fourth distance 280. For example, the third ratio can be between 0.15 and 0.45 (e.g., approximately 0.29, etc.). The decomposition chamber 108 can have a fourth ratio between the first distance 260 and the fifth distance 282. For example, the fourth ratio can be between 1.3 and 1.8 (e.g., approximately 1.57, etc.). The decomposition chamber 108 can have a fifth ratio between the second distance 262 and the third distance 278. For example, the fifth ratio can be between 1.2 and 1.7 (e.g., approximately 1.27, etc.). The decomposition chamber 108 can have a sixth ratio between the second distance 262 and the fourth distance 280. For example, the sixth ratio can be between 0.3 and 0.7 (e.g., approximately 0.56, etc.). The decomposition chamber 108 can have a seventh ratio between the second distance 262 and the fifth distance 282. For example, the seventh ratio can be between 1.2 and 2.0 (e.g., approximately 1.57, etc.). The decomposition chamber 108 can have an eighth ratio between the third distance 278 and the fourth distance 280. For example, the eighth ratio can be between 0.2-0.6 (e.g., approximately 0.44, etc.). The decomposition chamber 108 can have a ninth ratio between the third distance 278 and the fifth distance 282. For example, the ninth ratio can be between 2 and 3.2 (e.g., approximately 2.34, etc.). The decomposition chamber 108 can have a tenth ratio between the fourth distance 280 and the fifth distance 282. For example, the tenth ratio can be between 8 and 4 (e.g., approximately 5.38, etc.).

Figure 10:
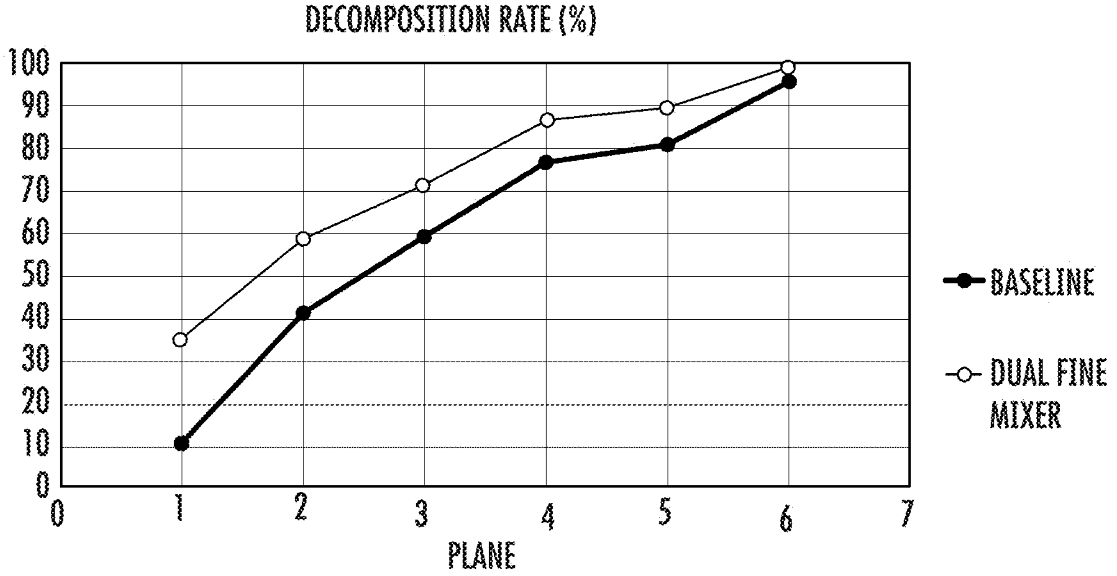
FIG. 10 is graph showing example decomposition rates for a decomposition chamber.

FIG. 10 depicts a graph showing Decomposition Rate for both a “Baseline” decomposition chamber (e.g., containing only the first mixing plate 228) and a “Dual Fine Mixer” decomposition chamber (e.g., containing the first mixing plate 228 and the second mixing plate 240). The Decomposition Rate is measured as the percentage of $NO_x$ emissions in the exhaust that have been optimally reduced. A Decomposition Rate of 100%, for example, means that all $NO_x$ emissions in the exhaust have been optimally reduced.

Figure 11:
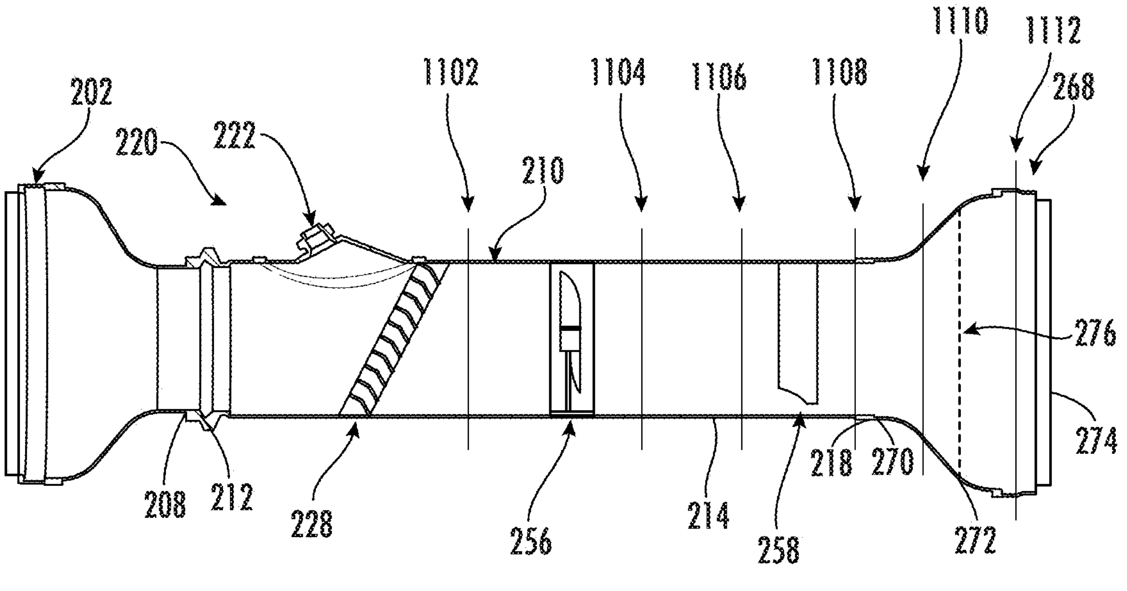
FIG. 11 is a cross-sectional view of an example decomposition chamber for an aftertreatment system.
Figure 12:
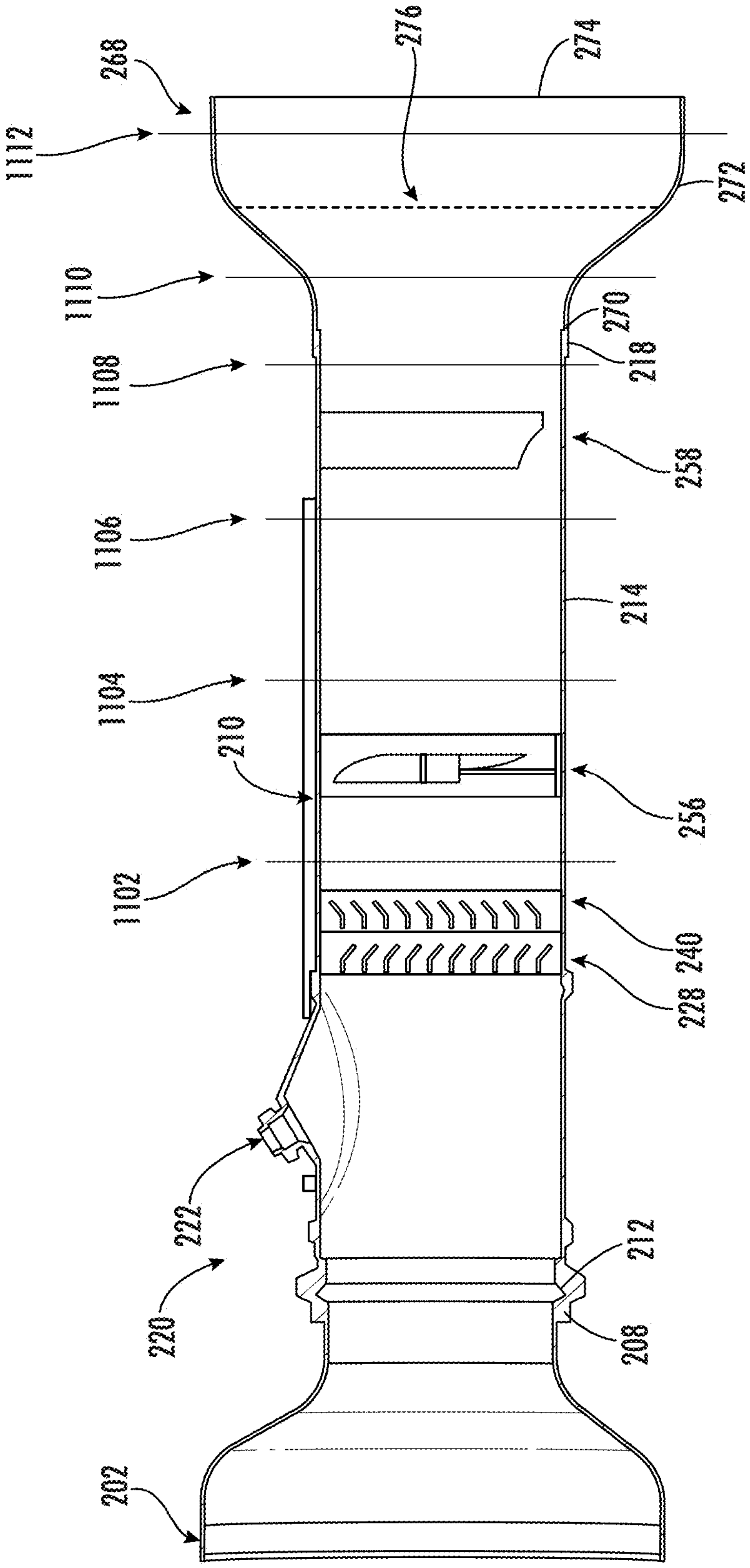
FIG. 12 is a cross-sectional view of an example decomposition chamber for an aftertreatment system.

The Decomposition Rate is plotted in FIG. 10 at six different planes (e.g., a first plane 1102, a second plane 1104, a third plane 1106, a fourth plane 1108, a fifth plane 1110, and a sixth plane 1112) along the conduit axis 216. These planes are illustrated in FIG. 11 on the "Baseline" decomposition chamber (e.g., containing only the first mixing plate 228) and in FIG. 12 on the "Dual Fine Mixer" decomposition chamber (e.g., containing the first mixing plate 228 and the second mixing plate 240) at the same locations along the conduit axis 216.

The first plane 1102 in the "Baseline" decomposition chamber is disposed downstream of the first mixing plate 228 and upstream of the vane mixer 256. At this location, mixing by the first mixing plate 228 has been performed but mixing by the vane mixer 256 has not yet been performed. The Decomposition Rate at the first plane 1102 for the "Baseline" decomposition chamber is approximately 10%.

The first plane 1102 in the "Dual Fine Mixer" decomposition chamber is disposed downstream of the first mixing plate 228 and the second mixing plate 240 and upstream of the vane mixer 256. At this location, mixing by the first mixing plate 228 and the second mixing plate 240 has been performed but mixing by the vane mixer 256 has not yet been performed. The Decomposition Rate at the first plane 1102 for the "Dual Fine Mixer" decomposition chamber is approximately 35%. Thus, at least in some applications, the Decomposition Rate is approximately 25% higher when measured at the first plane 1102 in the "Dual Fine Mixer" decomposition chamber compared to in the "Baseline" decomposition chamber. Thus, at least in some applications, there is approximately a 250% increase in Decomposition Rate when measured at the first plane 1102 in the "Dual Fine Mixer" decomposition chamber compared to in the "Baseline" decomposition chamber.

The second plane 1104 in the "Baseline" decomposition chamber is disposed downstream of the vane mixer 256 and upstream of the baffle 258. At this location, mixing by the first mixing plate 228 and the vane mixer 256 has been performed but the flow distribution has not yet been made more uniform by the baffle 258. The Decomposition Rate at the second plane 1104 for the "Baseline" decomposition chamber is approximately 40%.

The second plane 1104 in the "Dual Fine Mixer" decomposition chamber is disposed downstream of the vane mixer 256 and upstream of the baffle 258. At this location, mixing by the first mixing plate 228, the second mixing plate 240, and the vane mixer 256 has been performed but the flow distribution has not yet been made more uniform by the baffle 258. The Decomposition Rate at the second plane 1104 for the "Dual Fine Mixer" decomposition chamber is approximately 60%. Thus, at least in some applications, the Decomposition Rate is approximately 20% higher when measured at the second plane 1104 in the "Dual Fine Mixer" decomposition chamber compared to the "Baseline" decomposition chamber. Thus, at least in some applications, there is approximately a 50% increase in Decomposition Rate when measured at the second plane 1104 in the "Dual Fine Mixer" decomposition chamber compared to the "Baseline" decomposition chamber.

The third plane 1106 in the "Baseline" decomposition chamber is disposed downstream of the second plane 1104 and upstream of the baffle 258. At this location, mixing by the first mixing plate 228 and the vane mixer 256 has been performed but the flow distribution has not yet been made more uniform by the baffle 258. The Decomposition Rate at the third plane 1106 for the "Baseline" decomposition chamber is approximately 60%.

The third plane 1106 in the "Dual Fine Mixer" decomposition chamber is disposed downstream of the second plane 1104 and upstream of the baffle 258. At this location, mixing by the first mixing plate 228, the second mixing plate 240, and the vane mixer 256 has been performed by the flow distribution has not yet been made more uniform by the baffle 258. The Decomposition Rate at the third plane 1106 for the "Dual Fine Mixer" decomposition chamber is approximately 70%. Thus, at least in some applications, the Decomposition Rate is approximately 10% higher when measured at the third plane 1106 in the "Dual Fine Mixer" decomposition chamber compared to the "Baseline" decomposition chamber. Thus, at least in some applications, there is approximately a 16.67% increase in Decomposition Rate when measured at the third plane 1106 in the "Dual Fine Mixer" decomposition chamber compared to the "Baseline" decomposition chamber.

The fourth plane 1108 in the "Baseline" decomposition chamber is disposed downstream of the baffle 258 and upstream of the perforated plate 276. At this location mixing by the first mixing plate 228 and the vane mixer 256 has been performed and the flow distribution has been made more uniform by the baffle 258 but the exhaust and reductant mixture has not yet been made uniform by the perforated plate 276. The Decomposition Rate at the fourth plane 1108 for the "Baseline" decomposition chamber is approximately 75%.

The fourth plane 1108 in the "Dual Fine Mixer" decomposition chamber is disposed downstream of the baffle 258 and upstream of the perforated plate 276. At this location mixing by the first mixing plate 228, the second mixing plate 240, and the vane mixer 256 has been performed and the flow distribution has been made more uniform by the baffle 258 but the exhaust and reductant mixture has not yet been made uniform by the perforated plate 276. The Decomposition Rate at the fourth plane 1108 for the "Dual Fine Mixer" decomposition chamber is approximately 85%. Thus, at least in some applications, the Decomposition Rate is approximately 10% higher when measured at the fourth plane 1108 in the "Dual Fine Mixer" decomposition chamber compared to the "Baseline" decomposition chamber. Thus, at least in some applications, there is approximately a 13.33% increase in Decomposition Rate when measured at the fourth plane 1108 in the "Dual Fine Mixer" decomposition chamber compared to the "Baseline" decomposition chamber.

The fifth plane 1110 in the "Baseline" decomposition chamber is disposed downstream of the fourth plane 1108 and upstream of the perforated plate 276. At this location mixing by the first mixing plate 228 and the vane mixer 256 has been performed and the flow distribution has been made more uniform by the baffle 258 but the exhaust and reductant mixture has not yet been made uniform by the perforated plate 276. The Decomposition Rate at the fifth plane 1110 for the "Baseline" decomposition chamber is approximately 80%.

The fifth plane 1110 in the "Dual Fine Mixer" decomposition chamber is disposed downstream of the fourth plane 1108 and upstream of the perforated plate 276. At this location mixing by the first mixing plate 228, the second mixing plate 240, and the vane mixer 256 has been performed and the flow distribution has been made more uniform by the baffle 258 but the exhaust and reductant mixture has not yet been made uniform by the perforated plate 276. The Decomposition Rate at the fifth plane 1110 for the "Dual Fine Mixer" decomposition chamber is approximately 90%. Thus, at least in some applications, the Decomposition Rate is approximately 10% higher when measured at the fifth plane 1110 in the "Dual Fine Mixer" decomposition chamber compared to the "Baseline" decomposition chamber. Thus, at least in some applications, there is approximately a 12.50% increase in Decomposition Rate when measured at the fifth plane 1110 in the "Dual Fine Mixer" decomposition chamber compared to the "Baseline" decomposition chamber.

The sixth plane 1112 in the "Baseline" decomposition chamber is disposed downstream of the perforated plate 276 and upstream of the downstream outlet opening 274. At this location, mixing by the first mixing plate 228 and the vane mixer 256 has been performed, the flow distribution has been made more uniform by the baffle 258, and the exhaust and reductant mixture has been made uniform by the perforated plate 276. The Decomposition Rate at the sixth plane 1112 for the "Baseline" decomposition chamber is approximately 95%.

The sixth plane 1112 in the "Dual Fine Mixer" decomposition chamber is disposed downstream of the perforated plate 276 and upstream of the downstream outlet opening 274. At this location, mixing by the first mixing plate 228, the second mixing plate 240, and the vane mixer 256 has been performed, the flow distribution has been made more uniform by the baffle 258, and the exhaust and reductant mixture has been made uniform by the perforated plate 276. The Decomposition Rate at the sixth plane 1112 for the "Dual Fine Mixer" decomposition chamber is approximately 100%. Thus, at least in some applications, the Decomposition Rate is approximately 5% higher when measured at the sixth plane 1112 in the "Dual Fine Mixer" decomposition chamber compared to the "Baseline" decomposition chamber. Thus, at least in some applications, there is approximately a 5.26% increase in Decomposition Rate when measured at the sixth plane 1112 in the "Dual Fine Mixer" decomposition chamber compared to the "Baseline" decomposition chamber.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A decomposition chamber for an aftertreatment system, the decomposition chamber comprising:

a conduit having an inlet and an outlet, the conduit extending along a conduit axis from the inlet to the outlet;

a first mixing plate disposed in the conduit, the first mixing plate comprising:

a plurality of first vertical crossmembers, a plurality of first transverse crossmembers, each of the first transverse crossmembers coupled to at least one of the first vertical crossmembers, and a plurality of first deflectors, each of the first deflectors coupled to one of the first vertical crossmembers or one of the first transverse crossmembers;

a second mixing plate disposed in the conduit downstream of the first mixing plate, the second mixing plate comprising:

a plurality of second vertical crossmembers, a plurality of second transverse crossmembers, each of the second transverse crossmembers coupled to at least one of the second vertical crossmembers, and a plurality of second deflectors, each of the second deflectors coupled to one of the second vertical crossmembers or one of the second transverse crossmembers;

a vane mixer disposed in the conduit downstream of the first mixing plate and the second mixing plate, the vane mixer comprising a plurality of vanes, the vanes defining a plurality of vane apertures therebetween; and a baffle coupled to the conduit downstream of the vane mixer, the baffle comprising a portion having a partial annular shape.

2. The decomposition chamber of claim 1, further comprising:

a doser mount coupled to the conduit, the doser mount comprising an injection opening centered on an injection axis;

wherein, in a cross-sectional view along the conduit axis of the conduit, the injection axis of the doser mount is oriented at an injection angle between 105 degrees and 165 degrees, inclusive, relative to the conduit axis.

3. The decomposition chamber of claim 1, wherein, in a reference plane, which extends along the conduit axis of the conduit, an orientation of a first plate plane in which the plurality of first vertical crossmembers extend is at a first plate angle between 30 degrees and 90 degrees clockwise, inclusive, relative to the conduit axis.

4. The decomposition chamber of claim 1, wherein, in a reference plane, which extends along the conduit axis of the conduit, an orientation of a second plate plane in which the plurality of second vertical crossmembers extend is at a second plate angle between 30 degrees and 90 degrees clockwise, inclusive, relative to the conduit axis.

5. The decomposition chamber of claim 2, wherein:

the doser mount comprises:

a connection port defining the injection opening, an upstream wall extending from the connection port toward the inlet of the conduit, in a reference plane, which extends along the conduit axis of the conduit, the upstream wall is oriented at a first mount angle relative to the conduit axis, the first mount angle between 0 degrees and 5 degrees, inclusive, and a downstream wall extending from the connection port toward the outlet of the conduit, in the reference plane, the downstream wall is at a second mount angle relative to the conduit axis, the second mount angle between 135 degrees and 175 degrees, inclusive.

6. The decomposition chamber of claim 1, wherein:

the vane mixer is disposed a first distance from the first mixing plate along the conduit axis; and the baffle is disposed a second distance from the vane mixer along the conduit axis, the second distance greater than the first distance.

7. The decomposition chamber of claim 2, wherein:

the first mixing plate comprises a first upstream edge;

a first portion of the first upstream edge is positioned at a first location along the conduit axis and opposite the doser mount, and a second portion of the first upstream edge is positioned at a second location along the conduit axis, adjacent and downstream of the doser mount;

the second mixing plate comprises a second upstream edge; and a first portion of the second upstream edge is positioned at a third location along the conduit axis and opposite the doser mount, and a second portion of the second upstream edge is positioned at a fourth location along the conduit axis adjacent and downstream of the doser mount.

8. The decomposition chamber of claim 2, wherein in a reference plane, which extends along the conduit axis of the conduit, the injection axis is at a deflection angle between 10 degrees and 120 degrees, inclusive relative to a mixer plane in which the plurality of first vertical crossmembers and second vertical crossmembers extend.

9. The decomposition chamber of claim 1, wherein the baffle comprises:

a baffle wall coupled to the conduit; and a baffle flange projecting radially inward from the baffle wall.

10. The decomposition chamber of claim 9, wherein:

the baffle flange is disposed along a baffle plane, the baffle plane perpendicular to a reference plane, which extends along the conduit axis of the conduit; and in the reference plane, a mixer plane in which the plurality of first vertical crossmembers and second vertical crossmembers extend is at a mixer plane angle relative to the baffle plane, the mixer plane angle between 0 degrees and 80 degrees, inclusive.

11. The decomposition chamber of claim 2, wherein:

the baffle extends along a portion of an inner surface of the conduit; and a reference plane, which extends along the conduit axis of the conduit, bisects the doser mount and extends through a portion of the baffle.

12. The decomposition chamber of claim 1, wherein:

an upstream portion of the plurality of first deflectors and an upstream portion of the plurality of second deflectors defines a deflector plane; and in a reference plane, which extends along the conduit axis of the conduit, the deflector plane is parallel to the conduit axis.

13. The decomposition chamber of claim 1, wherein the first mixing plate is parallel to the second mixing plate.

14. The decomposition chamber of claim 7, wherein:

the first mixing plate comprises a first downstream edge; and the first downstream edge is separated from the second upstream edge by a distance that is less than 100 millimeters.

15. A decomposition chamber for an aftertreatment system, the decomposition chamber comprising:

a conduit having an inlet and an outlet, the conduit extending along a conduit axis from the inlet to the outlet;

a first mixing plate disposed in the conduit, the first mixing plate comprising:

a downstream edge, a plurality of first vertical crossmembers, a plurality of first transverse crossmembers, each of the first transverse crossmembers coupled to at least one of the first vertical crossmembers, and a plurality of first deflectors, each of the first deflectors coupled to one of the first vertical crossmembers or one of the first transverse crossmembers, wherein, in a reference plane, which extends along the conduit axis of the conduit, an orientation of a first plate plane in which the plurality of first vertical crossmembers extend is at a first plate angle between 30 degrees and 90 degrees clockwise, inclusive, relative to the conduit axis; and a second mixing plate disposed in the conduit downstream of the first mixing plate, the second mixing plate comprising:

an upstream edge, a plurality of second vertical crossmembers, a plurality of second transverse crossmember, each of the second transverse crossmembers coupled to at least one of the second vertical crossmembers, and a plurality of second deflectors, each of the second deflectors coupled to one of the second vertical crossmembers or one of the second transverse crossmembers;

wherein the downstream edge is separated from the upstream edge by a distance that is less than 100 millimeters; and wherein in the reference plane, which extends along the conduit axis of the conduit, an orientation of the first plate plane in which the plurality of first vertical crossmembers extend is parallel to an orientation of a second plate plane in which the plurality of second vertical crossmembers extend.

16. The decomposition chamber of claim 15, further comprising:

a doser mount coupled to the conduit, the doser mount comprising an injection opening centered on an injection axis;

wherein, in a cross-sectional view along the conduit axis of the conduit, the injection axis of the doser mount is oriented at an injection angle 105 degrees and 165 degrees, relative to the conduit axis.

17. The decomposition chamber of claim 15, wherein, in the reference plane, which extends along the conduit axis of the conduit, the orientation of the second plate plane in which the plurality of second vertical crossmembers extend is at a second plate angle between 30 degrees and 90 degrees clockwise, inclusive, relative to the conduit axis.

18. A decomposition chamber for an aftertreatment system, the decomposition chamber comprising:

a conduit having an inlet and an outlet, the conduit extending along a conduit axis from the inlet to the outlet;

a first mixing plate disposed in the conduit, the first mixing plate comprising:

a downstream edge, a plurality of first vertical crossmembers, a plurality of first transverse crossmembers, each of the first transverse crossmembers coupled to at least one of the first vertical crossmembers, and a plurality of first deflectors, each of the first deflectors coupled to one of the first vertical crossmembers or one of the first transverse crossmembers, wherein in a reference plane, which extends along the conduit axis of the conduit, an orientation of a first plate plane in which the plurality of first vertical crossmembers extend is oblique to the conduit axis;

a second mixing plate disposed in the conduit downstream of the first mixing plate, the second mixing plate comprising:

an upstream edge, a plurality of second vertical crossmembers, a plurality of second transverse crossmembers, each of the second transverse crossmembers coupled to at least one of the second vertical crossmembers, and a plurality of second deflectors, each of the second deflectors coupled to one of the second vertical crossmembers or one of the second transverse crossmembers, wherein in the reference plane, an orientation of a second plate plane in which the plurality of second vertical crossmembers extend is oblique to the conduit axis;

wherein the downstream edge is separated from the upstream edge by a distance that is less than 100 millimeters; and wherein in the reference plane, the orientation of the first plate plane in which the plurality of first vertical crossmembers extend is parallel to the orientation of the second plate plane in which the plurality of second vertical crossmembers extend.

19. The decomposition chamber of claim 18, further comprising:

a doser mount coupled to the conduit, the doser mount comprising an injection opening centered on an injection axis;

wherein, in a cross-sectional view along the conduit axis of the conduit, the injection axis of the doser mount is oriented at an injection angle between 105 degrees and 165 degrees, inclusive, relative to the conduit axis.

20. A decomposition chamber for an aftertreatment system, the decomposition chamber comprising:

a conduit having an inlet and an outlet, the conduit extending along a conduit axis from the inlet to the outlet;

a first mixing plate disposed in the conduit, the first mixing plate comprising:

a plurality of first vertical crossmembers, a plurality of first transverse crossmembers, each of the first transverse crossmembers coupled to at least one of the first vertical crossmembers, and a plurality of first deflectors, each of the first deflectors coupled to one of the first vertical crossmembers or one of the first transverse crossmembers, wherein, in a reference plane, which extends along the conduit axis of the conduit, an orientation of a first plate plane in which the plurality of first vertical crossmembers extend is at a first plate angle between 30 degrees and 90 degrees clockwise, inclusive, relative to the conduit axis, a second mixing plate disposed in the conduit downstream of the first mixing plate, the second mixing plate comprising:

a plurality of second vertical crossmembers, a plurality of second transverse crossmembers, each of the second transverse crossmembers coupled to at least one of the second vertical crossmembers, and a plurality of second deflectors, each of the second deflectors coupled to one of the second vertical crossmembers or one of the second transverse crossmembers;

a vane mixer disposed in the conduit downstream of the first mixing plate and the second mixing plate, the vane mixer comprising a plurality of vanes, the vanes defining a plurality of vane apertures therebetween; and a baffle coupled to the conduit and comprising a portion having a partial annular shape.

21. A decomposition chamber for an aftertreatment system, the decomposition chamber comprising:

a conduit having an inlet and an outlet, the conduit extending along a conduit axis from the inlet to the outlet;

a first mixing plate disposed in the conduit, the first mixing plate comprising:

a plurality of first vertical crossmembers, a plurality of first transverse crossmembers, each of the first transverse crossmembers coupled to at least one of the first vertical crossmembers, and a plurality of first deflectors, each of the first deflectors coupled to one of the first vertical crossmembers or one of the first transverse crossmembers;

a second mixing plate disposed in the conduit downstream of the first mixing plate, the second mixing plate comprising:

a plurality of second vertical crossmembers, a plurality of second transverse crossmembers, each of the second transverse crossmembers coupled to at one of the second vertical crossmembers, and a plurality of second deflectors each of the second deflectors coupled to one of the second vertical crossmembers or one of the second transverse crossmembers;

a vane mixer disposed in the conduit downstream of the first mixing plate and the second mixing plate, the vane mixer comprising a plurality of vanes, the vanes defining a plurality of vane apertures therebetween;

a baffle coupled to the conduit and comprising a portion having a partial annular shape; and a doser mount coupled to the conduit, the doser mount comprising:

an injection opening centered on an injection axis, a connection port defining the injection opening, an upstream wall extending from the connection port toward the inlet of the conduit, in a reference plane, which extends along the conduit axis of the conduit, the upstream wall is oriented at a first mount angle relative to the conduit axis, the first mount angle between 0 degrees and 5 degrees, inclusive, and a downstream wall extending from the connection port toward the outlet of the conduit, in the reference plane, the downstream wall is at a second mount angle relative to the conduit axis, the second mount angle between 135 degrees and 175 degrees, inclusive;

wherein, in a cross-sectional view along the conduit axis of the conduit, the injection axis of the doser mount is oriented at an injection angle between 105 degrees and 165 degrees, inclusive, relative to the conduit axis.

22. A decomposition chamber for an aftertreatment system, the decomposition chamber comprising:

a conduit having an inlet and an outlet, the conduit extending along a conduit axis from the inlet to the outlet;

a first mixing plate disposed in the conduit, the first mixing plate comprising:

a plurality of first vertical crossmembers, a plurality of first transverse crossmembers, each of the first transverse crossmembers coupled to at least one of the first vertical crossmembers, and a plurality of first deflectors, each of the first deflectors coupled to one of the first vertical crossmembers or one of the first transverse crossmembers;

a second mixing plate disposed in the conduit downstream of the first mixing plate, the second mixing plate comprising:

a plurality of second vertical crossmembers, a plurality of second transverse crossmembers, each of the second transverse crossmembers coupled to at least one of the second vertical crossmembers, and a plurality of second deflectors, each of the second deflectors coupled to one of the second vertical crossmembers or one of the second transverse crossmembers;

a vane mixer disposed in the conduit downstream of the first mixing plate and the second mixing plate, the vane mixer comprising a plurality of vanes, the vanes defining a plurality of vane apertures therebetween;

a baffle coupled to the conduit and comprising a portion having a partial annular shape; and a doser mount coupled to the conduit, the doser mount comprising an injection opening centered on an injection axis, wherein:

in a cross-sectional view along the conduit axis of the conduit, the injection axis of the doser mount is oriented at an injection angle between 105 degrees and 165 degrees, inclusive, relative to the conduit axis;

the first mixing plate comprises a first upstream edge;

a first portion of the first upstream edge is positioned at a first location along the conduit axis and opposite the doser mount, and a second portion of the first upstream edge is positioned at a second location along the conduit axis, adjacent and downstream of the doser mount;

the second mixing plate comprises a second upstream edge; and a first portion of the second upstream edge is positioned at a third location along the conduit axis and opposite the doser mount, and a second portion of the second upstream edge is positioned at a fourth location along the conduit axis adjacent and downstream of the doser mount.

* * * * *